United States Patent
Hirohama et al.

(10) Patent No.: US 9,299,180 B2
(45) Date of Patent: Mar. 29, 2016

(54) IMAGE CREATION METHOD, IMAGE CREATION APPARATUS AND RECORDING MEDIUM

(75) Inventors: Masayuki Hirohama, Fussa (JP); Masaaki Sasaki, Hachioji (JP); Shinichi Matsui, Hamura (JP); Tetsuji Makino, Ome (JP); Mitsuyasu Nakajima, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 713 days.

(21) Appl. No.: 13/592,175

(22) Filed: Aug. 22, 2012

(65) Prior Publication Data
US 2013/0050241 A1 Feb. 28, 2013

(30) Foreign Application Priority Data
Aug. 25, 2011 (JP) ................. 2011-183636

(51) Int. Cl.
*G06T 13/40* (2011.01)
*G06T 7/00* (2006.01)

(52) U.S. Cl.
CPC ............... *G06T 13/40* (2013.01); *G06T 7/0081* (2013.01)

(58) Field of Classification Search
None
See application file for complete search history.

(56) References Cited

U.S. PATENT DOCUMENTS

| 8,063,917 B2 | 11/2011 | Igarashi |
| 2012/0218262 A1* | 8/2012 | Yomdin et al. ................. 345/419 |

FOREIGN PATENT DOCUMENTS

| WO | 2011045768 A2 | 4/2011 |

OTHER PUBLICATIONS

Chinese Office Action (and English translation thereof) dated Mar. 18, 2015, issued in counterpart Chinese Application No. 201210300972.3.

* cited by examiner

*Primary Examiner* — Aaron M Richer
(74) *Attorney, Agent, or Firm* — Holtz, Holtz & Volek PC

(57) ABSTRACT

An image creation method, includes: first obtaining a subject image including a subject region; second obtaining skeleton information related to a skeleton of a subject in the subject image obtained by the first obtaining; specifying, based on the skeleton information obtained by the second obtaining, color information of a contour portion of the subject region; and creating a back-side-image, based on the color information of the contour portion of the subject region specified by the specifying, by drawing a subject correspondent region of the back-side image showing a back side of the subject in a pseudo manner.

10 Claims, 21 Drawing Sheets

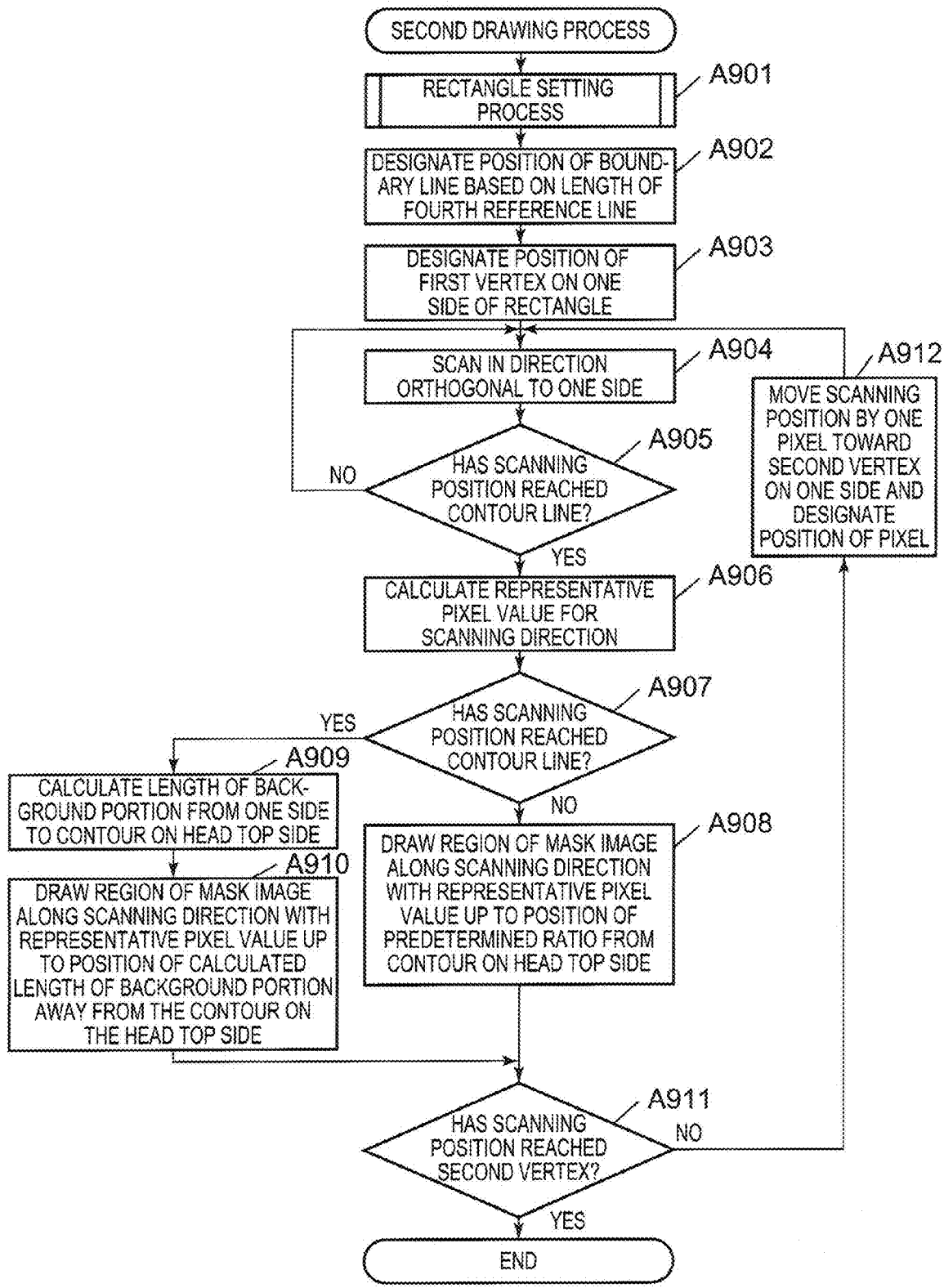

IMAGE CREATION METHOD, IMAGE CREATION APPARATUS AND RECORDING MEDIUM

CROSS-REFERENCE TO RELATED APPLICATIONS

This application is based upon and claims the benefit of priority from the prior Japanese Patent Application No. 2011-183636, filed on Aug. 25, 2011, the entire contents of which are incorporated herein by reference.

BACKGROUND OF THE INVENTION

1. Field of the Invention

The present invention relates to an image creation method, an image creation apparatus and a recording medium.

2. Description of Related Art

Heretofore, there has been known a technology for moving a two-dimensional still image by setting motion control points at desired positions of the still image concerned, and by designating desired motions to the motion control points to which motions are desired to be imparted (U.S. Pat. No. 8,063,917).

However, according to the technique of the aforementioned patent literature, in the case of rotating a still image in a predetermined direction, to express the rear side (back side) of the still image, it is necessary to separately prepare a rear side image thereof.

SUMMARY OF THE INVENTION

An object of the present invention is to provide an image creation method, image creation apparatus, and a recording medium which are capable of creating a back-side image easily.

According to an aspect of the present invention, there is provided an image creation method, including:

first obtaining a subject image including a subject region;

second obtaining skeleton information related to a skeleton of a subject in the subject image obtained by the first obtaining;

specifying, based on the skeleton information obtained by the second obtaining, color information of a contour portion of the subject region; and creating a back-side-image, based on the color information of the contour portion of the subject region specified by the specifying, by drawing a subject correspondent region of the back-side image showing a back side of the subject in a pseudo manner.

According to another aspect of the present invention, there is provided an image creation apparatus, including:

a first obtaining unit which obtains a subject image including a subject region;

a second obtaining unit which obtains skeleton information related to a skeleton of a subject in the subject image obtained by the first obtaining unit;

a specification unit which, based on the skeleton information obtained by the second obtaining unit, specifies color information of a contour portion of the subject region; and a creation unit which, based on the color information of the contour portion of the subject region specified by the specification unit, draws a subject correspondent region of a back-side image showing a back side of the subject in a pseudo manner to create the back-side image.

According to still another aspect of the present invention, there is provided a recording medium recording a program which makes a computer of an image creation apparatus realize functions of:

a first obtaining function of obtaining a subject image including a subject region;

a second obtaining function of obtaining skeleton information related to a skeleton of a subject in the subject image obtained by the first obtaining function;

a specification function of, based on the skeleton information obtained by the second obtaining function, specifying color information of a contour portion of the subject region; and a creation function of, based on the color information of the contour portion of the subject region specified by the specification function, drawing a subject correspondent region of a back-side image showing a back side of the subject in a pseudo manner to create the back-side image.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 15 is a flowchart showing an example of operations related to a second drawing process in the head drawing process of FIG. 13;

DETAILED DESCRIPTION OF THE PREFERRED EMBODIMENT

A description is given below of a specific mode of the present invention by using the drawings. Note that the scope of the invention is not limited to the illustrated examples.

Figure 1:
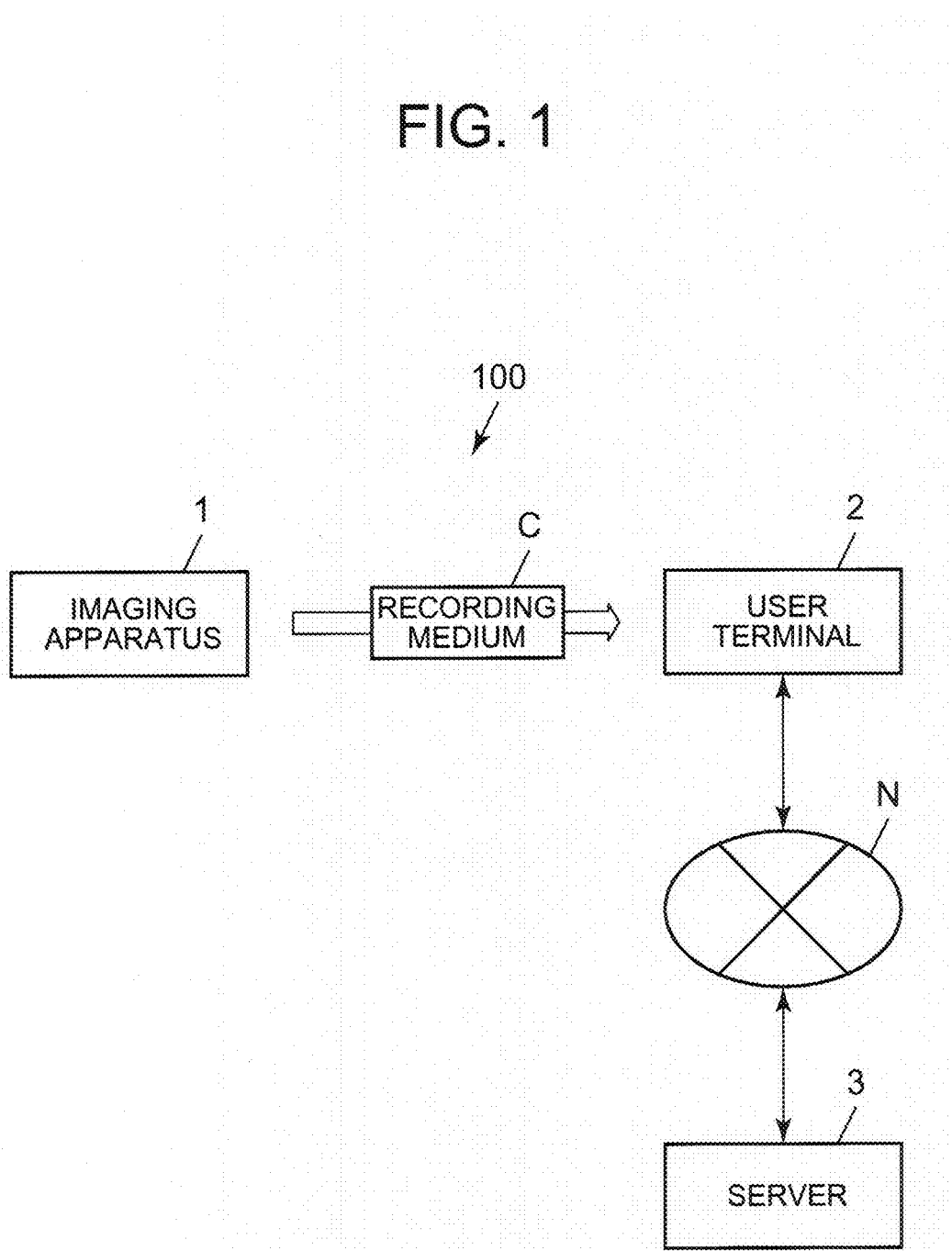
FIG. 1 is a block diagram showing a schematic configuration of an animation creation system of an embodiment to which the present invention is applied.

FIG. 1 is a block diagram showing a schematic configuration of an animation creation system 100 of an embodiment to which the present invention is applied.

As shown in FIG. 1, the animation creation system 100 of this embodiment includes: an imaging apparatus 1; a user terminal 2; and a server 3, in which the user terminal 2 and the server 3 are connected to each other through a predetermined communication network N so as to be capable of exchanging a variety of information therebetween.

First, a description is given of the imaging apparatus 1.

The imaging apparatus 1 is provided with an imaging function to image a subject, a recording function to record image data of the image in a recording medium C, and the like. That is to say, a publicly-known device is applicable as the imaging apparatus 1, and for example, the imaging apparatus 1 includes not only a digital camera which has the imaging function as a main function, but also a portable terminal such as a cellular phone provided with the imaging function though the imaging function is not regarded as the main function thereof.

Figure 2:
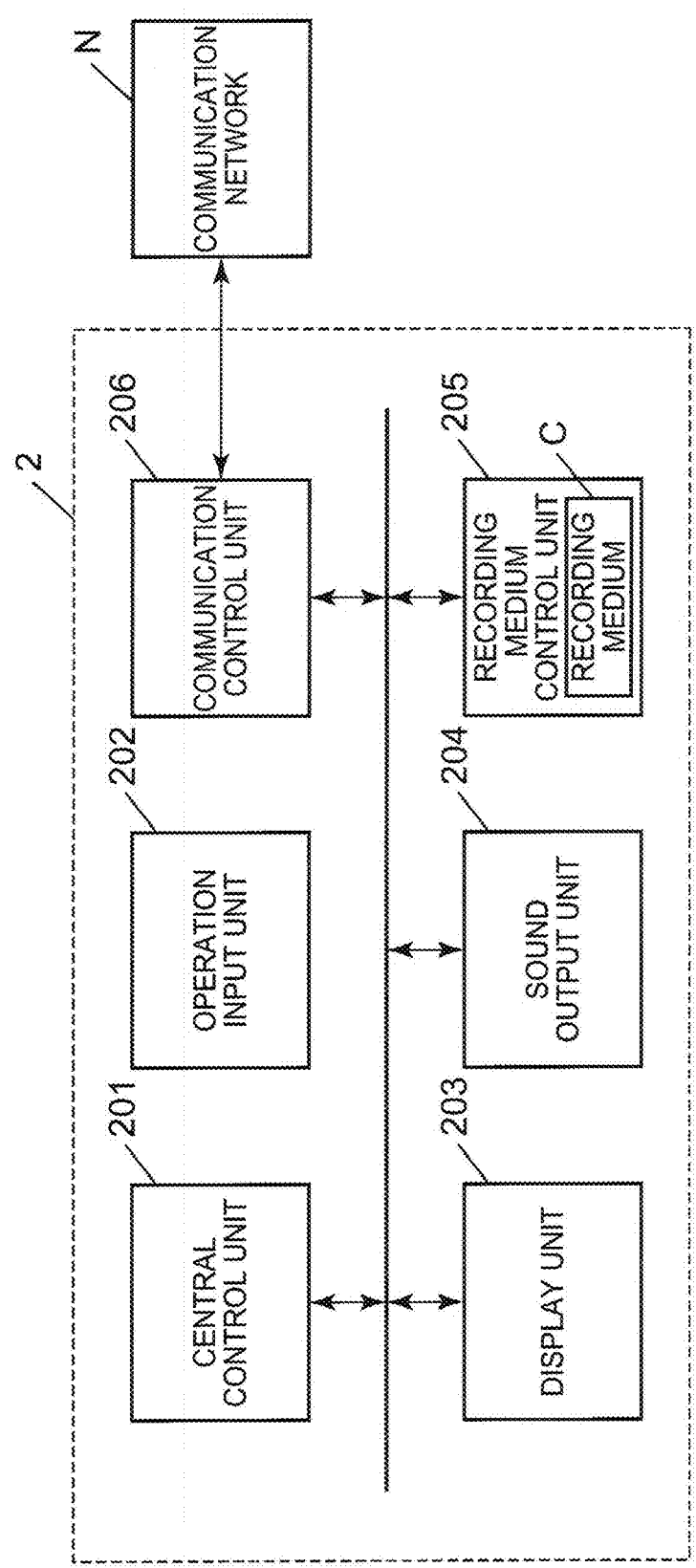
FIG. 2 is a block diagram showing a schematic configuration of a user terminal constituting the animation creation system of FIG. 1.

Next, a description is given of the user terminal 2 with reference to FIG. 2.

The user terminal 2, which is composed of a personal computer or the like, for example, is configured to access a Web page (for example, an animation creating page) set up by the server 3 and input a variety of instructions on the Web page.

FIG. 2 is a block diagram showing a schematic configuration of the user terminal 2.

As shown in FIG. 2, specifically, the user terminal 2 includes: a central control unit 201; an operation input unit 202; a display unit 203; a sound output unit 204; a recording medium control unit 205; a communication control unit 206; and the like.

The central control unit 201 controls each unit of the user terminal 2. Specifically, the central control unit 201 includes a CPU, a RAM, and a ROM (any thereof is not shown) and performs a variety of control operations in accordance with a variety of processing programs (not shown) for the user terminal 2, which are stored in the ROM. In this event, the CPU allows a storage region in the RAM to store results of a variety of processes, and allows the display unit 203 to display such processing results according to needs.

For example, the RAM includes: a program storage region for loading a processing program to be executed by the CPU, and the like; a data storage region for storing input data, processing results generated in the event where the processing program is executed, and the like; and the like.

The ROM stores: programs stored in a form of computer-readable program codes, specifically, a system program executable by the user terminal 2, a variety of processing programs executable by the system program; data for use in execution of these various processing programs; and the like.

For example, the operation input unit 202 includes: a keyboard, a mouse, and the like. For example, the keyboard is composed of: data input keys for inputting numeric values, letters, and the like; cursor keys for performing operations including data selection and feeding operations; a variety of function keys; and the like. The operation input unit 202 outputs a depression signal of a key pressed by a user and a mouse operation signal to the CPU of the central control unit 201.

Note that the operation input unit 202 may be configured so that a touch panel (not shown) is provided on a display screen of the display unit 203 to input a variety of instructions in response to contact positions of the touch panel.

The display unit 203 is composed of a display such as an LCD and a cathode ray tube (CRT), for example, and displays a variety of information on the display screen under control of the CPU of the central control unit 201.

That is to say, for example, based on page data of the Web page (for example, the animation creating page) which is transmitted from the server 3 and received by the communication control unit 206, the display unit 203 displays a Web page, which corresponds thereto, on the display screen. Specifically, based on image data of a variety of processing screens related to an animation creation process (described later), the display unit 203 displays a variety of processing screens on the display screen.

The sound output unit 204 is composed of a D/A converter, a low pass filter (LPF), an amplifier, a speaker, and the like, for example, and emits sound under the control of the CPU of the central control unit 201.

That is to say, for example, based on music information transmitted from the server 3 and received by the communication control unit 206, the sound output unit 204 converts digital data of the music information into analog data by the D/A converter and emits the music at predetermined tone, pitch, and duration from the speaker through the amplifier. Moreover, the sound output unit 204 may emit a sound of one sound source (for example, a musical instrument) or may emit sounds of plural sound sources simultaneously.

The recording medium control unit 205 is composed so that the recording medium C be freely attachable/detachable thereto/therefrom and controls reading of data from the recording medium C attached thereonto and controls writing of data to the recording medium C. That is to say, the recording medium control unit 205 reads out image data (YUV data) of a subject existing image (not shown), which is related to the animation creation process (described later), from the recording medium C detached from the imaging apparatus 1 and attached onto the recording medium control unit 205, and then outputs the read image data to the communication control unit 206.

Herein, the subject existing image refers to an image in which a main subject exists on a predetermined background. Moreover, in the recording medium C, there is recorded image data of the subject existing image, which is encoded by an image processing unit (not shown) of the imaging apparatus 1 in accordance with a predetermined encoding format (for example, a JPEG format or the like).

Then, the communication control unit 206 transmits the image data of the received subject existing image to the server 3 through the predetermined communication network N.

The communication control unit 206 is composed of a modulator/demodulator (MODEM), a terminal adapter, and the like, for example. The communication control unit 206 is a unit for performing communication control for information between the user terminal 2 and an external instrument such as the server 3 through the predetermined communication network N.

Note that, for example, the communication network N is a communication network constructed by using a dedicated line or an existing general public line, and can use a variety of line forms such as a local area network (LAN) and a wide area network (WAN). Moreover, for example, the communication network N includes: a variety of communication networks such as a telephone network, an ISDN network, a dedicated line, a mobile network, a communication satellite line, and a CATV network; an Internet service provider connecting these to one another; and the like.

Figure 3:
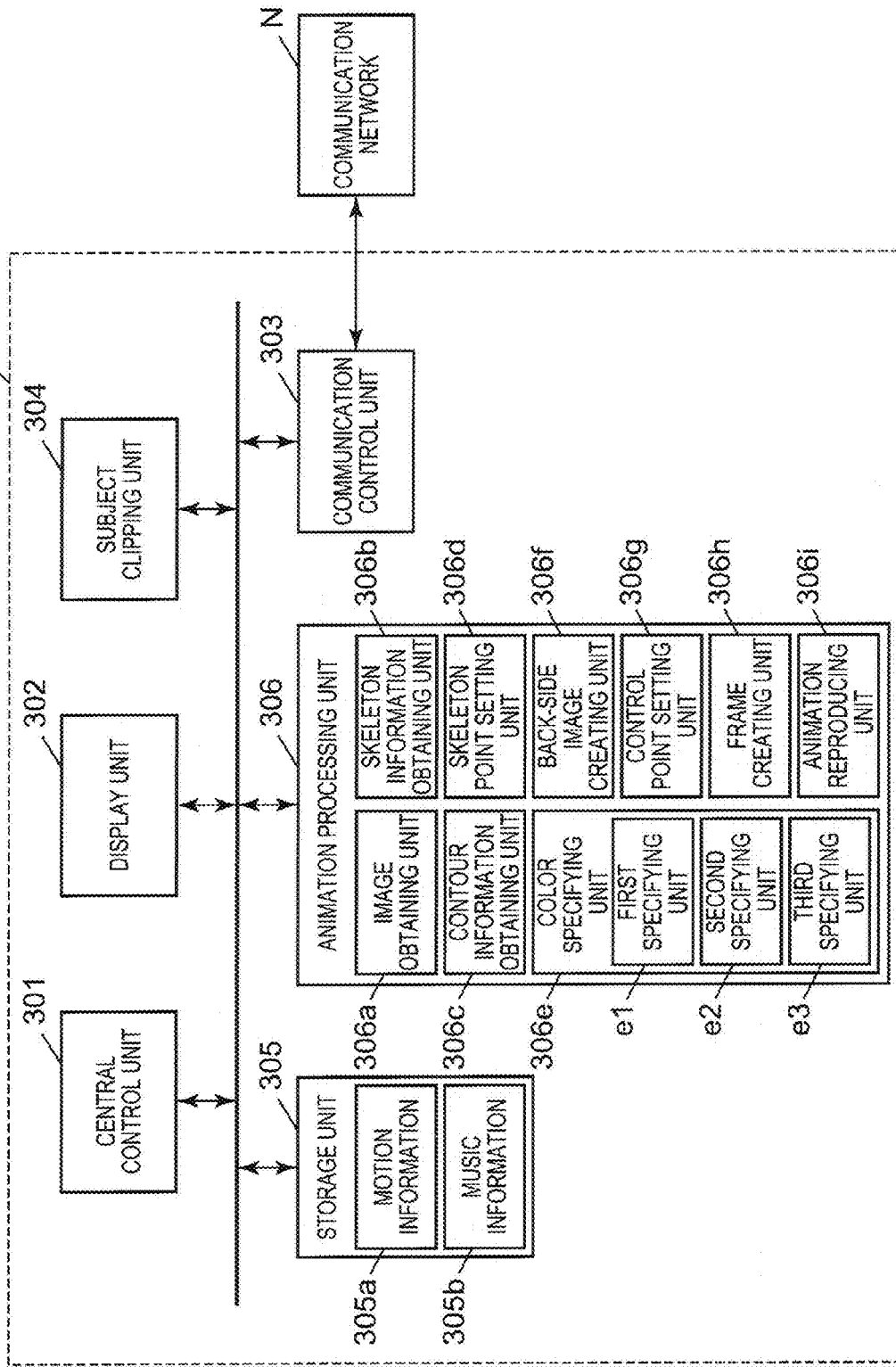
FIG. 3 is a block diagram showing a schematic configuration of a server constituting the animation creation system of FIG. 1.

Next, a description is given of the server 3 with reference to FIG. 3.

The server 3 is a Web (world wide web) server that is provided with a function to build the Web page (for example, the animation creating page) on the Internet. The server 3 transmits the page data of the Web page to the user terminal 2 in response to an access from the user terminal 2 concerned. Moreover, as an image creation apparatus, based on skeleton information related to the skeleton of a subject in a subject image containing a subject region Ps, the server 3 specifies color information of the contour portion of the subject region Ps. Based on the color information of the contour portion of the subject region Ps, the server 3 then draws a subject correspondent region Pa of a back-side image P3 in parts of the subject, thus creating the back-side image P3 showing the back of the subject in a pseudo manner.

FIG. 3 is a block diagram showing a schematic configuration of the server 3.

As shown in FIG. 3, specifically, the server 3 includes: a central control unit 301; a display unit 302; a communication control unit 303; a subject clipping unit 304; a storage unit 305; an animation processing unit 306; and the like.

The central control unit 301 controls the respective units of the server 3. Specifically, the central control unit 301 includes a CPU, a RAM, and a ROM (any thereof is not shown) and performs a variety of control operations in accordance with a variety of processing programs (not shown) for the server 3, which are stored in the ROM. In this event, the CPU allows a storage region in the RAM to store results of a variety of processes and allows the display unit 302 to display such processing results according to needs.

For example, the RAM includes: a program storage region for loading a processing program to be executed by the CPU and the like; a data storage region for storing input data, processing results generated in the event where the processing program is executed, and the like; and the like.

The ROM stores: programs stored in a form of computer-readable program codes, specifically, a system program executable by the server 3, a variety of processing programs executable by the system program; data for use in execution of these various processing programs; and the like.

For example, the display unit 302 is composed of a display such as an LCD or a CRT and displays a variety of information on a display screen under control of the CPU of the central control unit 301.

The communication control unit 303 is composed of a MODEM, a terminal adapter, and the like, for example. The communication control unit 303 is a unit for performing communication control for information between the server 3 and an external instrument such as the user terminal 2 through the predetermined communication network N.

Specifically, for example, the communication control unit 303 receives the image data of the subject existing image, which is transmitted from the user terminal 2 through the predetermined communication network N in the animation creation process (described later), and outputs the received image data to the CPU of the central control unit 301.

The CPU of the central control unit 301 outputs the image data of the received subject existing image to the subject clipping unit 304.

The subject clipping unit 304 creates a subject clipped image P1 (see FIG. 16A) from the subject existing image.

That is to say, by using a publicly-known subject clipping method, the subject clipping unit 304 creates the subject clipped image P1, in which the subject region Ps including the subject is clipped from the subject existing image. Specifically, the subject clipping unit 304 obtains the image data of the subject existing image outputted from the CPU of the central control unit 301 and partitions the subject existing image, which is displayed on the display unit 203, by boundary lines (not shown) drawn on the subject existing image concerned, for example, based on a predetermined operation for the operation input unit 202 (for example, the mouse and the like) of the user terminal 2 by the user. Subsequently, the subject clipping unit 304 estimates the background of the subject in the plural partition regions obtained by the partitioning by such clipping lines of the subject existing image, performs a predetermined arithmetic operation based on pixel values of the respective pixels of the estimated background, and estimates that a background color of the subject is a predetermined single color. Thereafter, the subject clipping unit 304 creates difference information (for example, a difference degree map and the like) between the respective pixels of such a background image with the predetermined single color and the corresponding pixels of the subject existing image. Then, the subject clipping unit 304 compares pixel values of the respective pixels in the created difference information with a predetermined threshold value, then binarizes the pixel values, and thereafter, performs labeling for assigning a same number to a set of pixels which compose a same connected component, and defines a set of pixels having the largest area as a subject portion.

Thereafter, the subject clipping unit 304 causes the binarized difference information to be subjected to a low pass filter, generates intermediate values for a boundary portion, and thereby creates alpha values. Herein, the binarized difference information of the foregoing set of pixels in the largest area is "1", and that of the other portions is "0", for example. Then, the subject clipping unit 304 creates an alpha map (not shown) as position information indicating the position of the subject region Ps in the subject clipped image P1.

For example, the alpha value ($0 \leq \alpha \leq 1$) is a value that represents weight in the event of alpha blending of the image of the subject region Ps with the predetermined background for each pixel of the subject existing image. In this case, the alpha value of the subject region becomes "1", and the transparency of the subject existing image to the predetermined background becomes 0%. Meanwhile, the alpha value of such a background portion of the subject becomes "0", and the transparency of the subject existing image to the predetermined background becomes 100%.

Then, based on the alpha map, the subject clipping unit 304 synthesizes the subject image with the predetermined single color image to create image data of the subject clipped image P1 so that, among the respective pixels of the subject existing image, the pixels with alpha values of "1" are not transparent to the predetermined single color image and the pixels with alpha values of "0" are transparent.

Moreover, based on the alpha map, the subject clipping unit 304 creates a mask image P2 (see FIG. 16B) as a binary image, in which the pixel value of each pixel of the subject region (the region white in FIG. 16B) is set to a first pixel value (for example, "1" or the like), and the pixel value of each pixel of such a background region (region black in FIG. 16B) is set to a second pixel value (for example, "0" or the like) different from the first pixel value. That is to say, the subject clipping unit 304 creates the mask image P2 as the position information indicating the position of the subject region Ps in the subject clipped image P1.

For example, the image data of the subject clipped image P1 is data associated with the position information of the created alpha map, mask image P2, and the like.

Note that the above-described subject clipping method by the subject clipping unit 304 is merely an example and the subject clipping method of the present invention is not limited to this. The subject clipping method of the present invention may be any one of the publicly known methods of clipping the subject region Ps, which includes a subject, from the subject existing image.

Moreover, for example, the image data of the subject clipped image may be image data of an RGBA format, and specifically, may include information of the transparency A in addition to the respective colors defined in an RGB color space. In this case, by using the information of the transparency A, the subject clipping unit 304 may create the position information (not shown) indicating the position of the subject region Ps in the subject clipped image P1.

For example, the storage unit 305 is composed of a non-volatile semiconductor memory, a hard disc drive (HDD), or the like, for example, and stores the page data of the Web page, which is to be transmitted to the user terminal 2, the image data of the subject clipped image P1, which is created by the subject clipping unit 304, and the like.

Moreover, the storage unit 305 stores plural pieces of motion information 305a for use in the animation creation process.

Each piece of the motion information 305a is information indicating motions of plural motion points in a predetermined space. The predetermined space is, for example, a two-dimensional flat space defined by two axes (for example, an x-axis, a y-axis, or the like) perpendicular to each other, or a three-dimensional stereoscopic space defined by these two axes and another axis (for example, a z-axis or the like) perpendicular to the above two axes in addition thereto. Note that each piece of the motion information 305a may also be such information that gives a sense of depth to the motions of the plural motion points by rotating the two-dimensional flat space about a predetermined rotation axis.

Herein, the positions of the respective motion points are individually defined in consideration of a skeleton shape, joint positions, and the like of a dynamic model (for example, a person, an animal, or the like) which serves as a model of motions. Note that the number of motion points is settable appropriately and arbitrarily in accordance with the shape and size of the dynamic model and the like.

In each piece of the motion information 305a, pieces of coordinate information, in each of which all of or at least one of the plural motion points are moved in the predetermined space, are arrayed successively at predetermined time intervals, whereby the motions of the plural motion points are continuously expressed. Note that each piece of the coordinate information of plural motion points may be information defining the amount of movement of the respective motion points with respect to the coordinate information of a reference motion point or information defining absolute positional coordinates of the respective motion points.

Moreover, the storage unit 305 stores plural pieces of music information 305b for use in the animation creation process.

Each piece of the music information 305b is information to automatically play a music together with an animation by an animation playing unit 306i (described later) of the animation creating unit 306. Specifically, the plural pieces of music information 305b are defined with varying tempos, beats, pitches, tones, keys, expression marks, and the like and are stored in relation to titles.

Moreover, each piece of music information 305b is digital data defined in accordance with, for example, the musical instruments digital interface (MIDI) standard. Specifically, each piece of music information 305b includes: header information defining the number of tracks, quarter note resolution (tick count), and the like; track information composed of an event and timing which are supplied to a sound source (for example, a musical instrument and the like) assigned to each part; and the like. Examples of the events of this track information are information for instructing a change of the tempo or rhythm or instructing Note On/OFF.

The animation processing unit 306 includes: an image obtaining unit 306a; a skeleton information obtaining unit 306b; an contour information obtaining unit 306c; a skeleton point setting unit 306d; a color specifying unit 306e; a backside image creating unit 306f; a control point setting unit 306g; a frame creating unit 306h; and an animation playing unit 306i.

The image obtaining unit 306a obtains a still image for use in the animation creation process.

That is to say, as a first obtaining unit, the image obtaining unit 306a obtains the subject clipped image (subject image) P1, which is obtained by clipping the subject region Ps containing the subject from the subject existing image including the background and the subject. Specifically, the image obtaining unit 306a obtains the image data of the subject clipped image P1, which is created by the subject clipping unit 304, as a still image to be processed.

The image obtaining unit 306a obtains image data of a mask image P2 associated with the image data of the subject clipped image P1.

The skeleton information obtaining unit 306b obtains skeleton information related to the skeleton of the subject of the subject clipped image P1.

That is to say, the skeleton information obtaining unit 306b, as a second obtaining unit, obtains the skeleton information related to the skeleton of the subject of the subject clipped image P1, which is obtained by the image obtaining unit 306a. Specifically, the skeleton information obtaining unit 306b performs thinning for the image data of the mask image P2 obtained by the image obtaining unit 306a, that is, the image data of the mask image P2, which is associated with the image data of the subject clipped image P1 and indicates the position of the subject region Ps in the subject clipped image P1, to create an image of lines having a width of a predetermined number of pixels (for example, one pixel), thus creating a skeleton line image (not shown) as the skeleton information.

For example, the skeleton information obtaining unit 306b creates the skeleton line image by applying the Hilditch's algorithm to the image data of the mask image P2, the Hilt-itch's algorithm repeating search and deletion of images satisfying a variety of conditions: in the image concerned, not to delete end points as boundary points, to preserve isolated points, to preserve the connectivity, and the like.

Note that the skeleton information obtaining process by the skeleton information obtaining unit 306b is merely an example and can be changed appropriately and arbitrarily. As the thinning process, the Hilditch's algorithm is applied, but this is merely an example. The present invention is not limited thereto, and the thinning process can be appropriately and arbitrarily changed.

Moreover, for the mask image P2 and subject clipped image P1, the foregoing thinning and a variety of image processing later described are performed with the upper left corner set to the origin coordinates (with the x-axis set to the horizontal direction and the y-axis set to the vertical direction), for example.

The contour information obtaining unit 306c obtains contour information related to the contour line of the subject region of the mask image P2.

Specifically, the contour information obtaining unit 306c specifies the respective pixels constituting the contour line of the subject region of the mask image P2, which is obtained by the image obtaining unit 306a, to obtain the contour information related to the coordinates of the respective pixels.

The skeleton point setting unit 306d sets skeleton points B associated with the skeleton within the subject region Ps of the subject clipped image P1.

That is to say, the skeleton point setting unit 306d sets plural skeleton points B, which are associated with the skeleton within the subject region Ps of the subject clipped image P1, based on the skeleton information obtained by the skeleton information obtaining unit 306b. Specifically, the skeleton point setting unit 306d specifies the plural skeleton points B at the positions corresponding to the respective representative parts of a person in the skeleton line image in consideration of the shape of the skeleton line image of the subject, the positions of the human joints, and the like. The skeleton point setting unit 306d sets the specified plural skeleton points B . . . at the corresponding positions of the subject clipped image P1 and mask image P2.

Figure 16A:
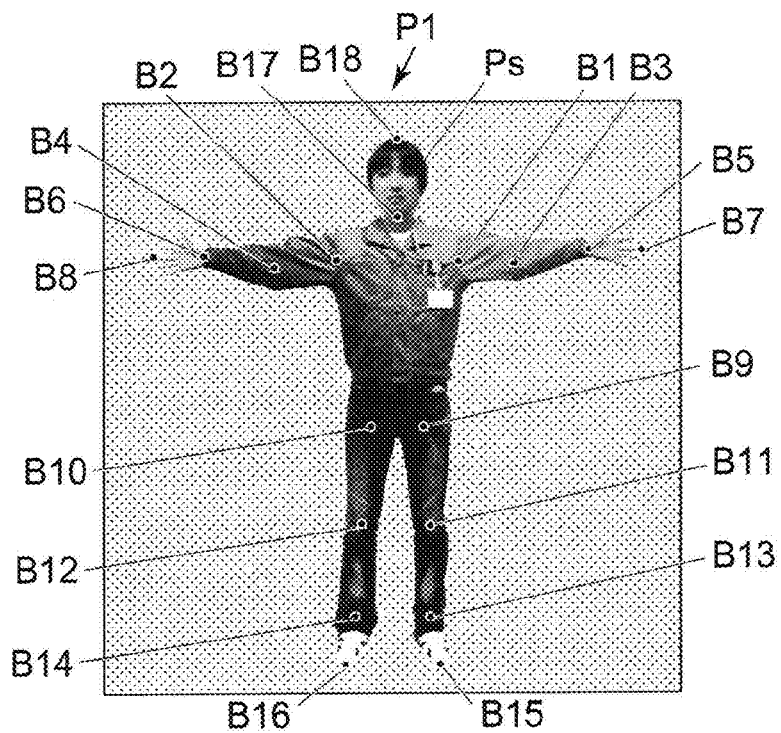
FIG. 16A is a view schematically showing an example of images related to the back-side image creation process of FIG. 6.
Figure 16B:
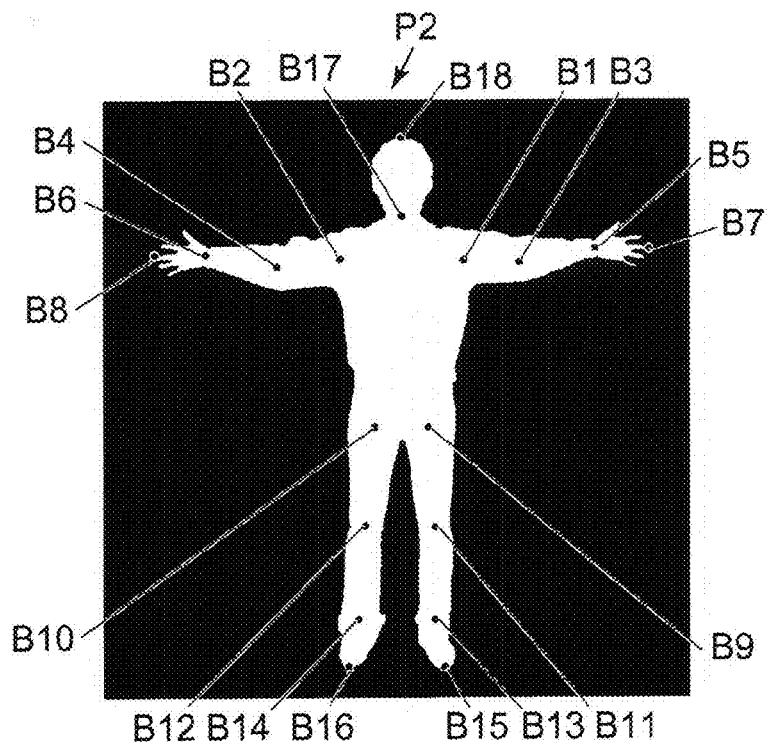
FIG. 16B is a view schematically showing another example of images related to the back-side image creation process of FIG. 6.

For example, the skeleton point setting unit 306d specifies in the skeleton line image: left and right shoulder skeleton points B1 and B2 at positions corresponding to the left and right human shoulders; left and right elbow skeleton points B3 and B4 at positions corresponding to the left and right elbows; left and right wrist skeleton points B5 and B6 at positions corresponding to the left and right wrists; left and right hand-tip skeleton points B7 and B8 at positions corresponding to the left and right hand-tips; left and right hip skeleton points B9 and B10 at positions corresponding to the left and right hip joints; left and right knee skeleton points B11 and B12 at positions corresponding to the left and right knees; left and right ankle skeleton points B13 and B14 at positions corresponding to the left and right ankles; left and right toe skeleton points B15 and B16 at positions corresponding to the left and right toes; a chin skeleton points B17 at a position corresponding to the chin; a head-top skeleton point B18 at a position corresponding to the top of the head; and the like (see FIGS. 16A and 16B). Based on the coordinates of the respective specified skeleton points B, the skeleton point setting unit 306d sets the respective skeleton points B to the corresponding positions (coordinates) of the subject clipped image P1 and mask image P2.

The foregoing skeleton points B are shown by way of example. The skeleton points B of the present invention are not limited to these and can be appropriately and arbitrarily changed.

The color specifying unit 306e specifies color information of the contour section of the subject region Ps of the subject clipped image P1.

That is to say, as a specifying unit, the color specifying unit 306e specifies the color information of the contour section of the subject region Ps of the subject clipped image P1 based on the skeleton information, which is obtained by the skeleton information obtaining unit 306b. Specifically, the color specifying unit 306e includes a first specifying unit e1, a second specifying unit e2, and a third specifying unit e3, which are configured to specify the color information of a contour section of the subject region Ps in representative human parts.

The first specifying unit e1 specifies the color information of the contour section of the respective portions corresponding to both human arms and legs in the subject region Ps.

That is to say, the first specifying unit e1 specifies the color information of the contour section of the portion corresponding to each of both human arms and legs based on a reference line L passing through some (for example, two) of the skeleton points B and B set at the portion corresponding to the arm or leg concerned. Specifically, in the subject clipped image P1 and mask image P2, the first specifying unit e1 sets the reference line L (for example, a first reference line L1) passing through plural skeleton points B . . . related to the portion corresponding to each of the human arms and legs in the subject region Ps and specifies the color information of the contour section of the portion corresponding to the arm or leg concerned in the direction orthogonal to the reference line L.

To be specific, for example, in an arm region drawing process of an arm drawing process (described later), the first specifying portion e1 specifies in the subject clipped image P1 and mask image P2, the right shoulder skeleton point B2, which is set at the position corresponding to the human right shoulder in the subject region Ps, and a right wrist skeleton point B6, which is set at the position corresponding to the human right shoulder in the subject region Ps. Based on the contour information obtained by the contour information obtaining unit 306c, then, the first specifying unit e1 specifies a first contour point C1 on the contour which intersects with a straight line extending from the right shoulder skeleton point B2 through the right wrist skeleton point B6 toward the right hand tip. The first specifying unit e1 sets as the first reference line L1, the line connecting the right shoulder skeleton point B2 and the first contour point C1 in the mask image P2.

Figure 17A:
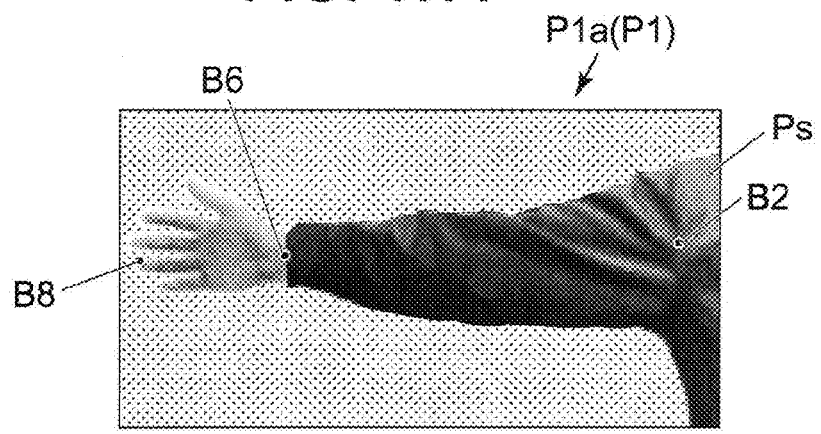
FIG. 17A is a view schematically showing an example of images related to the arm drawing process of FIG. 7.
Figure 17B:
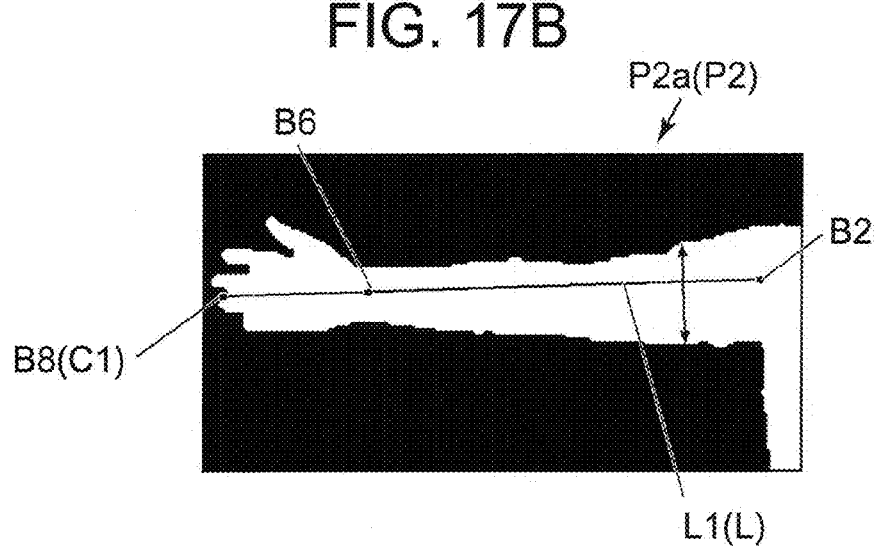
FIG. 17B is a view schematically showing another example of the images related to the arm drawing process of FIG. 7.

In FIG. 17B, the right hand-tip skeleton point B8 is at the same position as the first contour point C. However, FIG. 17B is merely an example, and the present invention is not limited to such a structure. The right hand-tip skeleton point B8 may be at a different position from that of the first contour point C1.

The first specifying unit e1 changing the position on the first reference line L1 in an arm image P2a (see FIG. 17B) of the mask image P2 in increments of a predetermined number of pixels (for example, in increments of one pixel) while scanning in the direction orthogonal to the first reference line L1 and, at each scan, specifies two points which sandwich the first reference line L1 in the orthogonal direction and at which the contour of the portion corresponding to the right arm in the subject region Ps intersects with the first reference line L1. Based on the two points on the contour of the portion corresponding to the right arm which are specified at each scan, the first specifying unit e1 then specifies the color information of the two contour portions of the portion corresponding to the right arm in the subject clipped image P1 at the scan concerned. Specifically, first, for the respective pixels constituting the first reference line L1, the first specifying unit e1 scans in a predetermined one of the two directions orthogonal to the first reference line L1 (for example, in the upward direction in FIG. 17B). If the first specifying unit e1 reaches the contour line of the portion corresponding to the right arm in the subject region Ps which is on one side, the first specifying unit e1 obtains the coordinates of the point on the contour line in the arm image P2a of the mask image P2. Subsequently, the first specifying unit e1 calculates a representative value (for example, the average) representing the pixel values of the point on the contour line and a predetermined number of pixels adjacent to the point of interest on the contour line. In a similar manner, the first specifying unit e1 performs the substantially same processing as above for the other direction of the two directions orthogonal to the first reference line L1 (for example, in the downward direction of FIG. 17B) and calculates a representative value (for example, the average) representing the pixel values of the point on the contour line and a predetermined number of pixels adjacent to the point of interest on the contour line.

Thereafter, at each scanning position, based on the representative value of the pixel values calculated for the two directions orthogonal to the first reference line L1, the first specifying unit e1 performs a predetermined arithmetic operation to calculate the representative pixel value (for example, the average) at the concerned scanning position on the first reference line L1.

The first specifying unit e1 may perform a predetermined arithmetic operation to calculate the representative pixel value (for example, the average) of each scanning position based on the pixel values of all the pixels arrayed in the direction orthogonal to the first reference line L1 at the concerned scanning position of the first reference line L1.

The first specifying unit e1 performs the substantially same processing as the aforementioned processing for the portion corresponding to the left arm in the subject region Ps at the arm region drawing process.

Moreover, the first specifying unit e1 performs the substantially same processing as the aforementioned processing for the portion corresponding to each leg in the subject region Ps at the leg region drawing process (described later). In such a case, the directions orthogonal to the reference line L are left and right directions in FIGS. 16A and 16B, for example.

Moreover, at a hand region drawing process (described later) of the arm drawing process, the first specifying unit e1 sets a rectangle R1 (see FIG. 18B) at the portion corresponding to each of human hands and toes in the subject region Ps and specifies the color information of the contour section corresponding to the interested hand or toe within the rectangle R1.

Specifically, the first specifying unit e1 sets the reference line L (for example, a second referential line L2) and the rectangle R1 surrounding each of the portions corresponding to the human hands and toes in the subject clipped image P1 and mask image P2. The foregoing reference line L passes through one of the skeleton points B which is set at the tip side of the portion corresponding to the concerned human hand or toe by the skeleton point setting unit 306b and another one of the skeleton points B adjacent to the foregoing skeleton point B. The rectangle R1 includes two sides parallel to the reference line L1 and two sides orthogonal to the reference line L. For example, at a rectangle setting process (described later) of the hand region drawing process, the first specifying unit e1 specifies the right wrist skeleton point B6, which is set at the position corresponding to the human right wrist in the subject region Ps, and the right hand skeleton point B8, which is set at the position corresponding to the right hand tip, in the subject clipped image P1 and mask image P2. Based on the contour information obtained by the contour information obtaining unit 306c, the first specifying unit e1 then specifies a second contour point C2 at which the contour line intersects with a straight line extending from the right wrist skeleton point B6 through the right hand skeleton point B8 toward the hand tip. As the second reference line L2, the first specifying unit e1 then sets the line connecting the right wrist skeleton point B6 and the second contour point C2 in the mask image P2. The first specifying unit e1 scans the contour line of an image P2a1 (see FIG. 18B), which is a part of the mask image P2 corresponding to the right hand of the subject region, based on the contour information and specifies a first intersection D1 which is located at the farthest position from the center of the subject region Ps (for example, the skeleton point B closer to the position of the center of gravity) among the points on the contour line at which the contour line intersects with the straight line orthogonal to the second reference line L2. Furthermore, based on the contour information, the first specifying unit e1 scans along the contour line of the image P2a1, which is the portion corresponding to the right hand in the subject region of the mask image P2, and specifies second and third intersections D2 and D3. The second and third intersections D2 and D2 are two points which are the farthest from the reference line L2 in the orthogonal direction among the points on the contour line at which the contour line intersects with straight lines extending in parallel on both sides of the second reference line L2. The first specifying unit e1 sets the rectangle R1 in contact with the first to third intersections D1 to D3 and the right wrist skeleton point B6 in the mask image P2 and obtains the coordinates of first to fourth vertices F1 to F4 of the rectangle R1.

Moreover, the first specifying unit e1 scans in the portion of the subject clipped image P1 which corresponds to each of the human hands and toes of the subject region Ps in a direction orthogonal to the second reference line L2 (for example, in the vertical direction of FIG. 18B) on a basis of one side of the rectangle R1 parallel to the second reference line L2 (for example, one side connecting the first and fourth vertices F1 and F4) and obtains color information of the portion of the subject region Ps existing in the rectangle R1 at each scan. Based on the color information of the portion of the subject region Ps existing in the rectangle R1 (the portion corresponding to each hand or toe), which is obtained at each scan, the first specifying unit e1 then specifies the color information of the contour section of the subject region Ps corresponding to the scan.

Specifically, for example, the first specifying unit e1 changes the position on the side of the rectangle R1 connecting the first and fourth vertices F1 and F4 (for example, in the vertical direction of FIG. 18B) in the hand image P2a1 of the mask image P2 in increments of a predetermined number of pixels (one pixel) while scanning in the direction orthogonal to the side concerned. The first specifying unit e1 then obtains the pixel value of each pixel of the subject region Ps (the portion corresponding to the human hand) existing in the rectangle R1 in the hand image P1a1 of the subject clipped image P1 at each scan. The first specifying unit e1, at each scan, calculates the representative value (for example, the average) of pixel values of the respective pixels of the portion corresponding to the human hand, which is a part of the subject region Ps existing in the rectangle R1, and specifies the color information of the contour portion in the subject region Ps corresponding to the scan concerned.

Figure 18A:
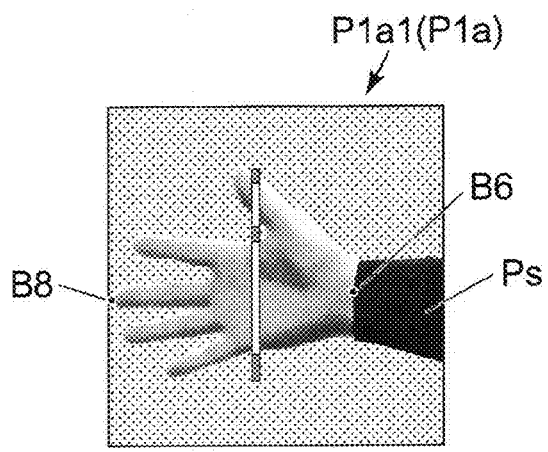
FIG. 18A is a view schematically showing an example of images related to the hand drawing process of FIG. 9.
Figure 18B:
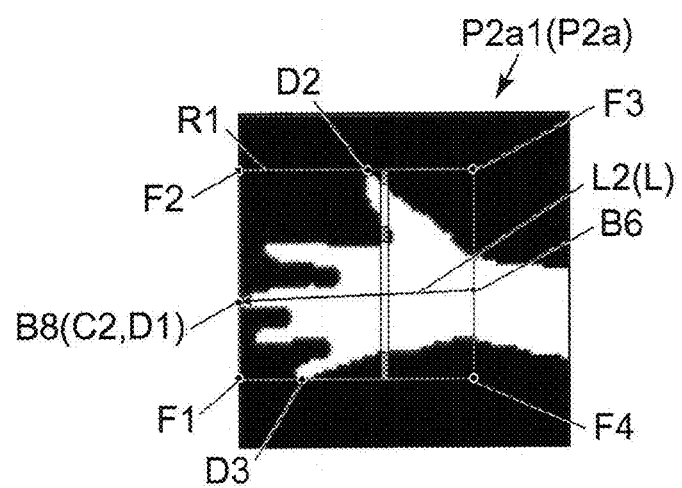
FIG. 18B is a view schematically showing another example of the images related to the hand drawing process of FIG. 9.

In FIG. 18B, the right hand skeleton point B8 is located at the same position as the second contour point C2 and the first intersection D1. However, such a structure is merely an example and does not limit the present invention. The right hand skeleton point B8, the second contour point C2, and the first intersection D1 may be located at different positions, or any two thereof may be located at the same position.

Moreover, the first specifying unit e1 performs the substantially same processing as the aforementioned processes in the hand region drawing process for the portion corresponding to the left arm in the subject region Ps.

The first specifying unit e1 also performs the substantially same processing as above at the toe region drawing process (described later) for the portion corresponding to each leg in the subject region Ps. In this case, the directions orthogonal to the reference line L are horizontal directions in FIGS. 16A and 16B, for example.

The second specifying unit e2 specifies the color information of the contour section of the portion corresponding to the human body in the subject region Ps.

That is to say, the second specifying unit e2 specifies the color information of the contour section of the portion corresponding to the body based on the reference line L which passes through one of the skeleton points B set in the portion corresponding to the human body by the skeleton point setting unit 306d. Specifically, in the subject clipped image P1 and the mask image P2, the second specifying unit e2 sets an extended line L3a. The extended line L3a is obtained by extending at least one end of the reference line L, which passes through one skeleton point B set in the portion corresponding to the human body and extends substantially along the spine, by a predetermined ratio to the reference line L (for example, ten percent) in the extending direction of the reference line L.

For example, at the body drawing process (described later), in the subject clipped image P1 and mask image P2, the second specifying unit e2 specifies a chin skeleton point B17, which is set at the position corresponding to the human chin in the subject region Ps, and left and right hip joint skeleton points B9 and B10, which are set at the positions corresponding to the hip joints. The second specifying unit e2 specifies a midpoint Bm between the left and right hip joint skeleton points B9 and B10 and then extends each end of the third reference line L3, which connects the midpoint Bm and the chin skeleton point B17, by ten percent in the extending direction of the reference line L to set the extended line L3a in the mask image P2.

The second specifying unit e2 scans in the direction orthogonal to the extended line L3a on a basis of the extended line L3a and obtains the color information of the portion corresponding to the human body in the subject region Ps at each scan. Based on the color information of the portion corresponding to the human body obtained at each scan, the second specifying unit e2 specifies the color information of the contour section of the portion corresponding to the human body in the subject region Ps for the scan concerned. In this event, the second specifying unit e2 scans on a basis of the extended line L3a in the direction orthogonal to the extended line L3a. The second specifying unit e2 thus specifies two points which sandwich the extended line L3 in the orthogonal direction and at which the scanning line orthogonal to the extended line L3a intersects with the contour of the portion corresponding to the human body in the subject region Ps, or two points which sandwich the extended line L3 in the orthogonal direction and at which the scanning line intersects with each arm or leg adjacent to the body in the subject region Ps. On a basis of the two point specified at each scan, the second specifying unit e2 obtains the color information of two contour sections in the portion corresponding to the human body in the subject region Ps.

Herein, the respective processes for the portion corresponding to the human body in the subject region Ps by the second specifying unit e2 are performed after drawing of both arms and legs in the subject correspondent region Pa of the back-side image P3 by the back-side image creating unit 306f.

That is to say, after the specification of the color information of the contour sections of the portions of the corresponding to both human arms and legs in the subject region Ps by the first specification unit e1 and the drawing of the portions corresponding to both human arms and legs by the back-side image creating unit 306f, the color information of the contour sections of the portion corresponding to the human body in the subject region Ps is specified by the second specifying unit e2, and the portion corresponding to the body is drawn by the back-side image creating unit 306f. Thereafter, the color information of the contour sections of the portion corresponding to the human head in the subject region Ps is specified by the third specifying unit e3, and the portion corresponding to the head is drawn by the back-side image creating unit 306f.

Figure 19A:
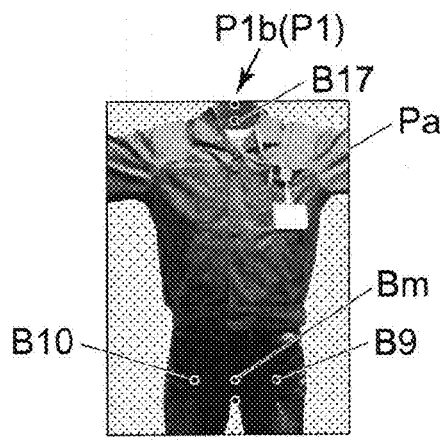
FIG. 19A is a view schematically showing an example of images related to the body drawing process of FIG. 12.
Figure 19B:
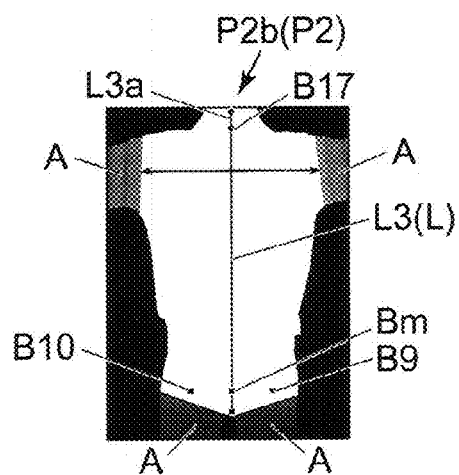
FIG. 19B is a view schematically showing another example of the images related to the body drawing process of FIG. 12.

The second specifying unit e2 changes the scanning position on the extended line L3a in the body image P2b of the mask image P2 in increments of a predetermined number of pixels (for example, in increments of one pixel) while scanning in the directions orthogonal to the extended line L3a (for example, in the horizontal directions of FIG. 19B). The second specifying unit e2 thus specifies two points which sandwich the extended line L3a in the orthogonal direction and at which the scanning line orthogonal to the extended line L3a intersects with the contour of the portion corresponding to the human body in the subject region Ps, or two points which sandwich the extended line L3a in the orthogonal direction and at which the scanning line intersects with the arms or legs adjacent to the body in the subject region Ps. On a basis of the two points on the contour of the portion corresponding to the human body in the subject region Ps or the two points in the both arms and legs, which are specified at each scan, the second specifying unit e2 specifies the color information of the two contour sections in the portion corresponding to the human body in the subject clipped image P1. Specifically, for the respective pixels constituting the extended ling L3a, the second specifying unit e2 scans first in a predetermined one (for example, in the left direction in FIG. 19B) of the two directions orthogonal to the extended line L3a. If reaching the contour line in one side of the portion corresponding to the body in the subject region Ps or reaching one of regions A in which the both arms and legs are already drawn (hereinafter, referred to as drawing finished regions), the second specifying unit e2 obtains the coordinates of the pixel on the contour line or the pixel located inside of a predetermined pixel in the drawing finished region A. Based on the body image P1b of the subject clipped image P1 (see FIG. 19A), the second specifying unit e2 then calculates the representative value (for example, the average) representing one of the pixel values of the pixel on the contour line and the pixel short of the predetermined pixel of the drawing finished region A and the pixel values of a predetermined number of pixels adjacent to the pixel concerned. In a similar manner, the second specifying unit e2 performs the substantially same processing as above for the other direction (for example, in the right direction of FIG. 193) of the two directions orthogonal to the extended line L3a and calculates the representative value (for example, the average) representing the pixel value of one of the pixel on the contour line and the pixel value of a pixel short of the predetermined pixel in the drawing finished region A and the pixel values of a predetermined number of pixels adjacent to the pixel concerned.

Thereafter, based on the representative value of the pixel values calculated for each of the two directions orthogonal to the extended line L3a, the second specifying unit e2 performs a predetermined arithmetic operation at each scanning position on the extended line L3e to calculate the representative pixel value (for example, the average) of the scanning position.

The second specifying unit e2 may perform a predetermined arithmetic operation to calculate the representative pixel value (for example, the average) of each scanning position based on the pixel values of all the pixels arrayed at each scanning position on the extended line L3a in the direction orthogonal to the extended line L3a.

The third specifying unit e3 specifies the color information of the contour section corresponding to the human head in the subject region Ps.

That is to say, on a basis of the reference line L passing through some (two) of the skeleton points B which are set at the portion corresponding to the human head by the skeleton point setting unit 306d, the third specifying unit 3e specifies the color information of the contour section of the portion corresponding to the head. Specifically, in the subject clipped image Pa and mask image P2, the third specifying unit e3 sets the reference line L (for example, a fourth reference line L4) passing through plural skeleton points B . . . related to the portion corresponding to the human head in the subject region Ps. The third specifying unit e3 then specifies the color information of the contour sections of the portion corresponding to the head which are in the directions orthogonal to and parallel to the reference line L. That is to say, in a first drawing process (described later) of the head drawing process, the third specifying unit e3 specifies the color information of the contour sections located in the direction orthogonal to the reference line L, which passes through one skeleton point B set in the top side of the portion corresponding to the human head in the subject region Ps and another skeleton point B adjacent to the foregoing skeleton point B. Then in a second drawing process, the third specifying unit e3 specifies the color information of the contour sections located in the direction parallel to the reference line L.

Specifically, in the first drawing process, the third specifying unit e3 scans on a basis of the reference line L in the direction orthogonal to the reference line L concerned and obtains the color information of the portion corresponding to the human head in the subject region Ps at each scan. Based on the color information of the portion corresponding to the human head in the subject region Ps, the color information being is obtained at each scan, the third specifying unit e3 then specifies the color information (for each scan) of the contour section of the portion corresponding to the human head in the subject region Ps.

For example, the third specifying unit e3 specifies the chin skeleton point 17, which is set at the position corresponding to the human chin in the subject region Ps, and the head top skeleton point B18, which is set at the position corresponding to the top of the head, in the subject clipped image P1 and the mask image P2. The third specifying unit e3 sets the line connecting the chin skeleton point B17 and the head top skeleton point B18 as the fourth reference line L4 in the mask image P2.

Figure 20A:
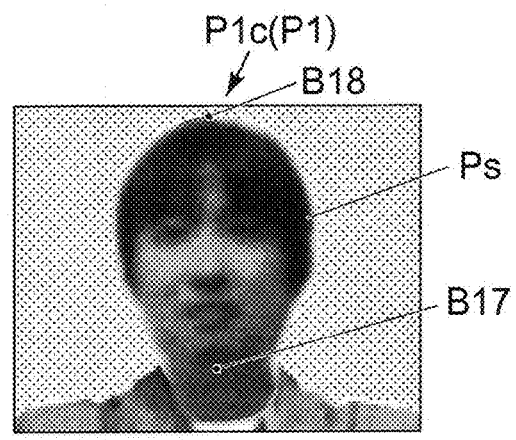
FIG. 20A is a view schematically showing an example of images related to the head drawing process of FIG. 13.
Figure 20B:
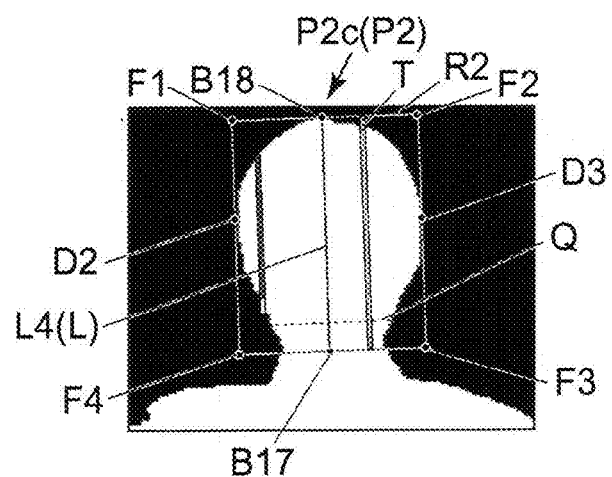
FIG. 20B is a view schematically showing another example of the images related to the head drawing process of FIG. 13.

The third specifying unit e3 changes the position on the fourth reference line L4 in the mask image P2 in increments of a predetermined number of pixels (for example, in increments of one pixel) while scanning in the directions orthogonal to the fourth reference line L4 (for example, in the horizontal directions of FIG. 20B). The third specifying unit e3 thus specifies two points which sandwich the reference line L4 in the orthogonal direction and at which the scanning line orthogonal to the reference line L4 intersects with the contour of the portion corresponding to the head in the subject region Ps at each scan. On a basis of the two points (specified at each scan) on the contour of the portion corresponding to the head in the subject region Ps, the third specifying unit e3 specifies at each scan, the color information of the two contour sections in the portion corresponding to the head in the subject clipped image P1. Specifically, for the respective pixels constituting the fourth reference line L4, the third specifying unit e3 scans first in a predetermined one (for example, in the left direction in FIG. 20B) of the two directions orthogonal to the fourth reference line L4. If reaching the contour line in one side of the portion corresponding to the head in the subject region Ps, the third specifying unit e3 obtains the coordinates of the point of interest on the contour line in the head image P2c of the mask image P2. Based on the head image P1c of the subject clipped image P1 (see FIG. 20A), the third specifying unit e3 then calculates the representative value (for example, the average) representing the pixel values of the point on the contour line and a predetermined number of pixels adjacent to the point of interest on the contour line. In a similar manner, the third specifying unit e3 performs the substantially same processing as above for the other one (for example, in the right direction of FIG. 20B) of the two directions orthogonal to the fourth reference line L4 and calculates the representative value (for example, the average) representing the pixel values of the point of interest on the contour line and a predetermined number of pixels adjacent to the point of interest on the contour line.

Subsequently, at each scanning position on the fourth reference line L4, the third specifying unit e3 performs a predetermined arithmetic operation to calculate the representative pixel value (for example, the average) of the scanning position based on the representative values of the pixel values calculated in each of the two directions orthogonal to the fourth reference line L4.

The third specifying unit e3 may perform a predetermined arithmetic operation to calculate the representative pixel value (for example, the average) at each scanning position based on the pixel values of all the pixels arrayed at the scanning position on the fourth reference line L4 in the direction orthogonal to the fourth reference line L4.

In the second drawing process, the third specifying unit e3 sets a rectangle R2 (see FIG. 20B) in the portion corresponding to the human head in the subject region Ps and specifies the color information of the contour section of the portion corresponding to the head in the rectangle R2. Specifically, the third specifying unit e3 sets the rectangle R2 surrounding the portion corresponding to the human head in the subject clipped image P1 and the mask image P2. The rectangle R2 includes two sides parallel to a reference line L (for example, the fourth reference line L4) and two lines orthogonal to the reference line L.

For example, in a rectangle setting process (described later) of the second drawing process, the third specifying unit e3 scans the contour line of the image P1c of the part of the subject region of the mask image P2 corresponding to the head based on the contour information obtained by the contour information obtaining unit 306c. The third specifying unit e3 specifies second and third intersections D2 and D3, which are the farthest from the fourth reference line L4 in the orthogonal direction among the points on the contour line at which the contour line intersects with two straight lines extending in parallel on both sides of the fourth reference line L4. The third specifying unit e3 sets the rectangle R2 which is in contact with the chin skeleton point B17, the head top skeleton point B18, and the second and third intersections D2 and D3 and obtains the coordinates of the first to fourth vertices F1 to F4 of the rectangle R2.

The third specifying unit e3 scans the portion corresponding to the human head in the subject region Ps of the subject clipped image P1 in the direction parallel to the fourth reference line L4 (for example, in the downward direction of FIG. 20B) on a basis of one side of the rectangle R1 orthogonal to the fourth reference line L4 (for example, one side connecting the first and second vertices F1 and F2) and at each scan, obtains the color information of the part of the subject region Ps within the rectangle R2. Based on the color information of the part of the subject region Ps within the rectangle R2 (the portion corresponding to the human head), which is obtained at each scan, the third specifying unit e3 then specifies the color information of the contour section of the subject region Ps, which corresponds to the scan.

Figure 20C:
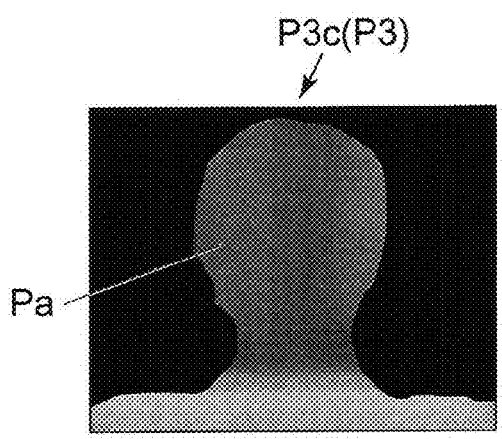
FIG. 20C is a view schematically showing still another example of the images related to the head drawing process of FIG. 13.
Figure 21A:
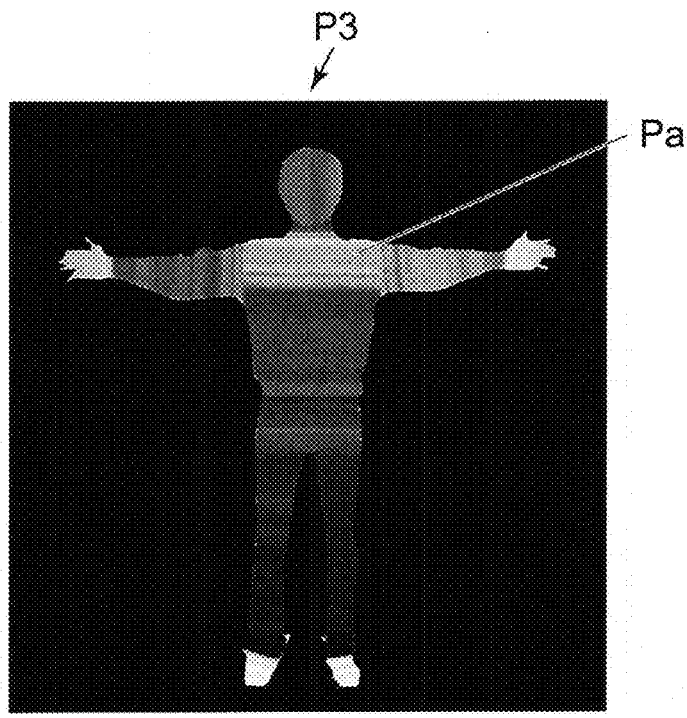
FIG. 21A is a view schematically showing an example of images related to the back-side image creation process of FIG. 6.
Figure 21B:
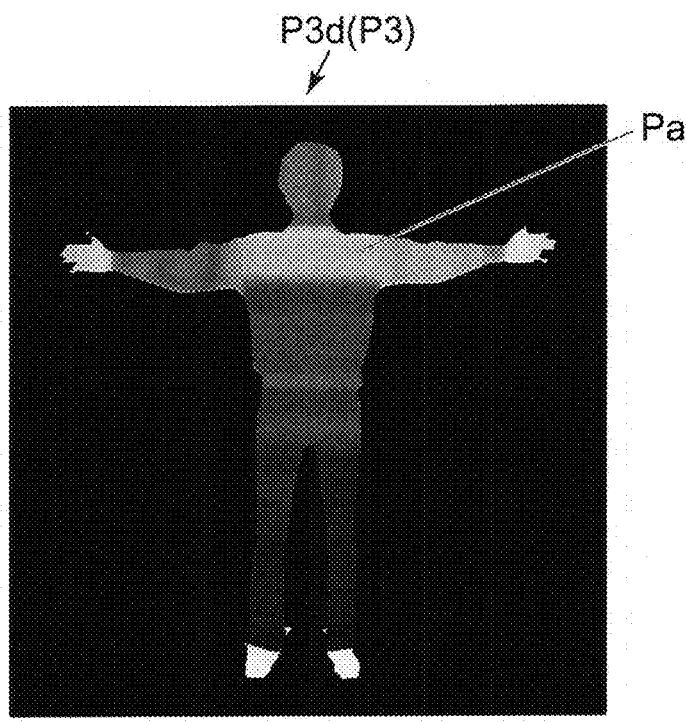
FIG. 21B is a view schematically showing another example of images related to the back-side image creation process of FIG. 6.

Specifically, for example, the third specifying unit e3 changes the scanning position on one side of the rectangle R2, which connects the first and second vertices F1 and F2 on the head top side in the head image P2c of the mask image P2 (see FIG. 20B), in increments of a predetermined number of pixels (for example, in increments of one pixel) while scanning in the direction orthogonal to the foregoing side of the rectangle R2 (for example, in the downward direction of FIG. 20B). If reaching the contour line of the part of the subject region Ps (the portion corresponding to the human head) within the rectangle R2 in the head image P1c of the subject clipped image P1 (see FIG. 20A), the third specifying unit e3 obtains the coordinates of the point on the contour line in the mask image P2. Thereafter, based on the head image P1c of the subject clipped image P1 (see FIG. 20), the third specifying unit e3 calculates the representative value (for example, the average) representing the pixel values of the point of interest on the contour line and the predetermined number of pixels which are adjacent to the point of interest on the contour line in the scanning direction (for example, in the downward direction of FIG. 20B) and specifies the calculated representative value as the color information of the contour section for the scan.

The back-side image creating unit 306f creates the back-side image P3 showing the back of the subject in a pseudo manner.

That is to say, based on the color information of the contour section of the subject region Ps, which is specified by the color specifying unit 306e, the back-side image creating unit 306f as a creating unit draws the subject correspondent region Pa of the back-side image P3 by parts of the subject to create the back-side image P3. Specifically, the back-side image creating unit 306f draws the subject correspondent region Pa of the back-side image P3 by parts of the subject including the reference lines L, that is, by human representative parts (for example, the both arms, both legs, body, head, and the like) to create the back-side image P3.

Figure 17C:
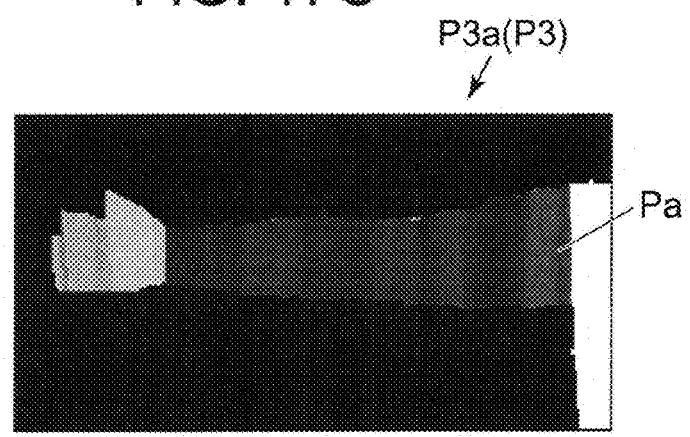
FIG. 17C is a view schematically showing still another example of the images related to the arm drawing process of FIG. 7.
Figure 18C:
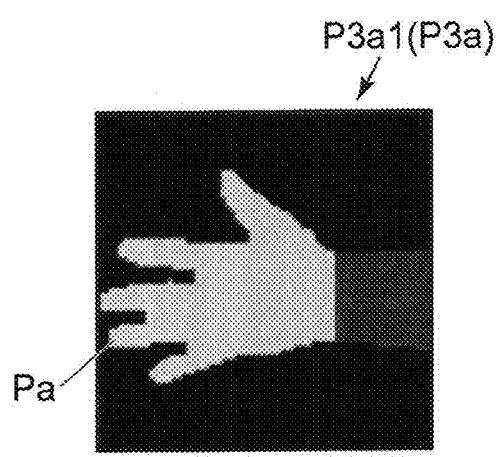
FIG. 18C is a view schematically showing still another example of the images related to the hand drawing process of FIG. 9.

Moreover, in the arm region drawing process of the arm drawing process, at each scan orthogonal to the reference line L (for example, the first reference line L1), among the subject correspondent region Pa of the mask image P2 (the back-side image P3), which corresponds to the subject region Ps (the region shown white in FIG. 16B) of the subject clipped image P1, the back-side image creating unit 306f draws the portion P3a (see FIG. 17C) corresponding to each arm with the representative value of the pixel values corresponding to the scan. Based on the color information of the contour section for each scan in the part of the subject region Ps existing in the rectangle R1, which is specified by the first specifying unit e1 of the color specifying unit 306e, the back-side image creating unit 306 then draws the portion P3a1 (see FIG. 18C) corresponding to each of the human hands and toes among the subject correspondent region Pa of the back-side image P3 at the scan. Specifically, in the hand region drawing process of the arm drawing process, at each scan in the direction orthogonal to the second reference line L2, the back-side image creating unit 306f draws the part of the portion P3a1 (corresponding to the human hand) within the rectangle R1 among the subject correspondent region Pa of the mask image P2 (the back-side image P3) with the representative value of the pixel values corresponding to the scan.

The back-side image creating unit 306f performs the substantially same processing as the aforementioned processing in the arm drawing process (described later) for the portions corresponding to the both legs in the subject correspondent region Pa of the mask image P2 (the back-side image P3). In this case, the directions orthogonal to the reference line L are the horizontal directions in FIGS. 16A and 16B.

Figure 19C:
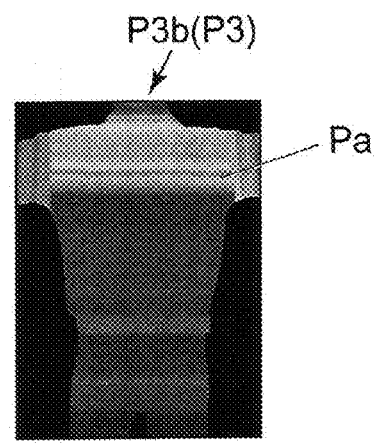
FIG. 19C is a view schematically showing still another example of the images related to the body drawing process of FIG. 12.

Moreover, based on the color information of the contour section (corresponding to the respective scans) of the portion corresponding to the human body in the subject region Ps, which is specified by the second specifying unit e2 of the color specifying unit 306e, the back-side image creating unit 306f draws the portion Psb (see FIG. 19C) (corresponding to the human body) in the subject correspondent region Pa of the back-side image P3 at each scan. Specifically, in the body drawing process, at each scan in the directions orthogonal to the extended line L3a, the back-side image creating unit 306f draws the portion P3b (corresponding to the body) in the subject correspondent region Pa of the mask image P2 (the back-side image P3), which corresponds to the subject region Ps of the subject clipped image P1, with the representative value of the pixel values for the scan.

Moreover, based on the color information of the contour sections in the directions orthogonal to the reference line L (for example, the fourth reference line L4) of the portion corresponding to the human head in the subject region Ps, which is specified by the third specifying unit e3 of the color specifying unit 306e, the back-side image creating unit 306f draws the portion P3c (see FIG. 20C) (corresponding to the human head) in the subject correspondent region Pa of the back-side image P3 in the orthogonal direction. Thereafter, based on the color information of the contour section (corresponding to each scan) of the part of the subject region Ps within the rectangle R2, which is specified by the third specifying unit e3, the back-side image creating unit 306f draws the portion P3c (corresponding to the human head) in the subject correspondent region Pa of the back-side image P3 in parallel to the reference line L.

Specifically, in the first drawing process of the head drawing process, the back-side image creating unit 306f draws for each scan in the direction orthogonal to the fourth reference line L4, the portion P3c (corresponding to the head) with the representative value of the pixel values for the scan among the subject correspondent region Pa of the mask image P2 (the back-side image P3), which corresponds to the subject region Ps of the subject clipped image p1.

Thereafter, in the second drawing process of the head drawing process, the back-side image creating unit 306f draws for each scan in the direction parallel to the fourth reference line L4, the portion corresponding to the head within the rectangle R2 with the representative value of the pixel values for the scan among the subject correspondent region Pa of the mask image P2 (the back-side image P3), which corresponds to the subject region Ps of the subject clipped image P1.

In this event, on a basis of at least one of length of the portion corresponding to the head within the rectangle R2 in the parallel direction to the reference line L and the length of one side of the rectangle R2 parallel to the reference line L, the back-side image creating unit 306f draws the portion P3c (corresponding to the human head) of the subject correspondent region P1 of the back-side image P3 up to a predetermined position in the parallel direction. That is to say, depending on whether or not the length of the portion corresponding to the head within the rectangle R2, parallel to the fourth reference line L4, related to the scan reaches a boundary line Q set on the chin side based on the length of the fourth reference line L4 (see FIG. 20B), the back-side image creating unit 306f changes the drawing region for the portion corresponding to the head within the rectangle R2.

For example, if the length of the portion corresponding to the head within the rectangle R2 in the parallel direction related to one scan does not reach the boundary line Q (for example, corresponding to the scan at the horizontal ends in FIG. 20B), among a region of the subject correspondent region Pa in the mask image P2 (back-side image P3) extended along the scanning direction, the back-side image creating unit 306f draws from the position of the contour on the head top side up to the position of a predetermined ratio to the length of the region with the representative pixel value. Moreover, if the length of the portion corresponding to the head within the rectangle R2 in the parallel direction related to one scan reaches the boundary line Q (for example, corresponding to one scan in the middle in the horizontal direction in FIG. 20B), the back-side image creating unit 306f calculates a length T of the background portion from the one side connecting the first and second vertices F1 and F2 to the contour on the head top side (see FIG. 20B). The back-side image creating unit 306f then subtracts the length T of the background portion from the length of the region extended along the scanning direction in the subject correspondent region of the mask image P2 (back-side image P3) to specify the chin position. The back-side image creating unit 306f then draws from the position of the contour on the head top side and the chin position with the representative pixels.

The control point setting unit 306g sets plural motion control points in the subject image of the subject clipped image P1 as a processing object.

That is to say, the control point setting unit 306g sets plural motion control points at the respective position corresponding to plural motion points in the subject image of the subject clipped image P1, which is obtained by the image obtaining unit 306a. Specifically, the control point setting unit 306g reads out the motion information 305a of the dynamic model (for example, an animal) from the storage unit 305 and in the subject image of the subject clipped image P1, individually sets the motion control points which correspond to the plural motion points of a reference frame (for example, a first frame or the like) defined in the motion information 305a concerned, at desired positions designated based on the predetermined operation for the operation input unit 202 of the user terminal 2 by the user.

Herein, by individually setting the motion control points in the subject image of the subject clipped image P1, the first setting unit 306b is configured to automatically set the motion control points also at predetermined positions in the back-side image P3 corresponding to the subject clipped image P1.

In this event, for the dynamic model and the subject image, for example, the first setting unit 306b may perform dimension adjustment (for example, enlargement, reduction, deformation, and the like of the dynamic model) so that sizes of a main portion such as a face can be matched with one another. Moreover, for example, the first setting unit 306b may overlap the dynamic model and the subject image one another to specify positions corresponding to the plural motion points in the subject image.

Moreover, for all of the plural motion points defined in the motion information 305a, the first setting unit 306b may set the motion control points corresponding thereto, or alternatively, may set only the motion control points corresponding to a predetermined number of representative motion points, such as the center portion, distal portions, and the like of the subject.

Note that, in the subject image of the subject clipped image P1, the control point setting unit 306g may automatically specify positions corresponding to the plural motion points of the reference frame (for example, the first frame or the like) defined in the motion information 305a read out from the storage unit 305. For example, in consideration of the skeleton shape, joint positions, and the like of the subject, the control point setting unit 306g specifies the positions corresponding to the plural motion points. Then, the control point setting unit 306g individually sets the motion control points at the positions corresponding to the plural specified motion points.

Moreover, even in the case where the setting of the motion control points by the control point setting unit 306b is automatically performed, correction (change) of the setting positions of the motion control points may be accepted based on a predetermined operation for the operation input unit by the user.

The frame creating unit 306h sequentially creates plural frame images constituting the animation.

That is to say, the frame creating unit 306h moves the plural motion control points set in the subject image of the subject clipped image P1 so as to allow the motion control points concerned to follow the motions of the plural motion points of the motion information 305a designated by the animation processing unit 306 and sequentially creates the plural frame images. Specifically, for example, the frame creating unit 306h sequentially obtains the coordinate information of the plural motion points which move at a predetermined time interval in accordance with the motion information 305a and calculates the coordinates of the motion control points corresponding to the respective motion points. Then, the frame creating unit 306h sequentially moves the motion control points to the calculated coordinates, in addition, moves and deforms a predetermined image region (for example, the triangular or rectangular mesh regions) set in the subject image based on at least one motion control point, and thereby creates the reference frame images (not shown).

Note that the process to move or deform a predetermined image region on a basis of the motion control point is a publicly known technique, and the detailed description thereof is omitted.

Moreover, the frame creating unit 306h creates interpolation frame images (not shown), each of which interpolates between two reference frame images which are created based on the plural motion control points respectively corresponding to the already moved motion points and are adjacent to each other along the time axis. That is to say, the frame creating unit 306h creates a predetermined number of the interpolation frame images, each of which interpolates between two reference frame images, so that the plural frame images can be played at a predetermined frame rate (for example, 30 fps and the like) by the animation playing unit 306i.

Specifically, between the two reference frame images adjacent to each other, the frame creating unit 306h constantly obtains a playing progress of a predetermined music played by the animation playing unit 306i, and in accordance with the progress concerned, sequentially creates the interpolation frame image to be played between the two reference frame images adjacent to each other. For example, the frame creating unit 306h obtains tempo setting information and the resolution (tick count) of the quarter note based on the music information 305b of the MIDI standard, and converts an elapsed time of the playing of the predetermined music to be played by the animation playing unit 306i into the tick count. Subsequently, based on the tick count corresponding to the elapsed time of the playing of the predetermined music, the frame creating unit 306h calculates a relative progress in the playing of the predetermined music between the two adjacent reference frame images which are synchronized with predetermined timing (for example, a first beat of each bar and the like), for example, by percentage. Then, in accordance with the relative progress of the playing of the predetermined music, the frame creating unit 306h changes the weights to the two adjacent reference frame images concerned to create the interpolation frame images.

Note that such process to create the interpolation frame images is a publicly known technique, and the detailed description thereof is omitted here.

Moreover, the creation of the reference frame images and the interpolation frame images by the frame creating unit 306h is performed also for both the image data of the subject clipped image P1 and the position information such as the alpha map.

The animation playing unit 306i plays each of the plurality of frame images created by the frame creating unit 306h.

That is to say, the animation playing unit 306i automatically plays the predetermined music based on the music information 305b designated based on a predetermined operation for the operation input unit 202 of the user terminal 2 by the user, and in addition, plays each of the plural frame images at the predetermined timing of the predetermined music. Specifically, the animation playing unit 306i converts the digital data of the music information 305b of the predetermined music into the analog data by a D/A converter and automatically plays the predetermined music. In this event, the animation playing unit 306i plays the adjacent two reference frame images so that the reference frame images can be synchronized with predetermined timing (for example, the first beat or respective beats of each bar or the like), and in addition, in accordance with the relative progress of the playing of the predetermined music between the adjacent two reference frame images, plays each of the interpolation frame images corresponding to the progress concerned.

Note that the animation playing unit 306i may play plural frame images, which are related to the subject image, at a speed designated by the animation processing unit 306i. In this case, the animation playing unit 306i changes the timing to synchronize the adjacent two reference frame images, thereby changes the number of frame images to be played within a predetermined unit time period, and varies the speed of the motion of the subject image.

Next, a description is given of the animation creating process, which uses the user terminal 2 and the server 3, with reference to FIG. 4 to FIG. 21.

Figure 4:
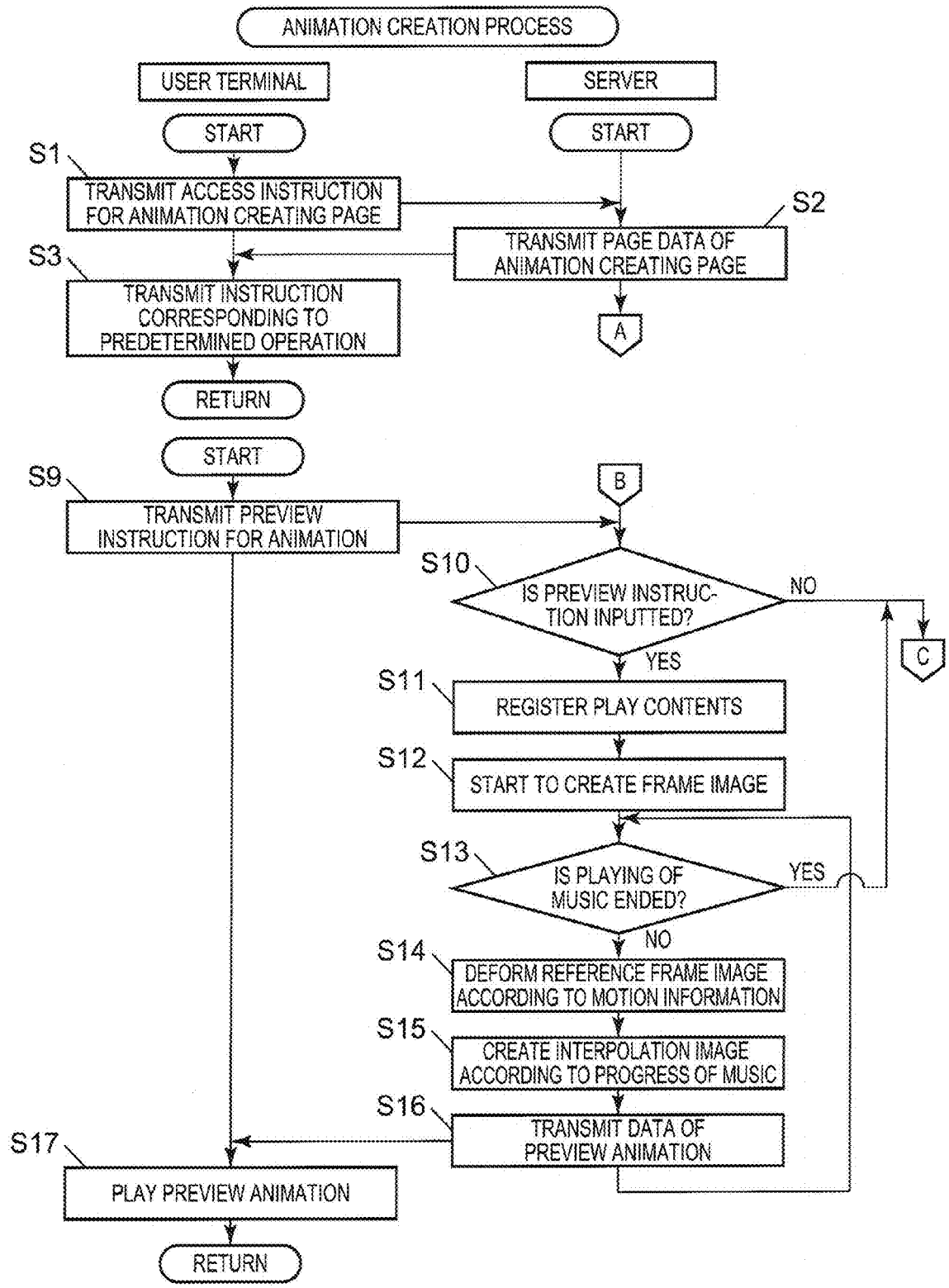
FIG. 4 is a flowchart showing an example of operations related to an animation creation process by the animation creation system of FIG. 1.
Figure 5:
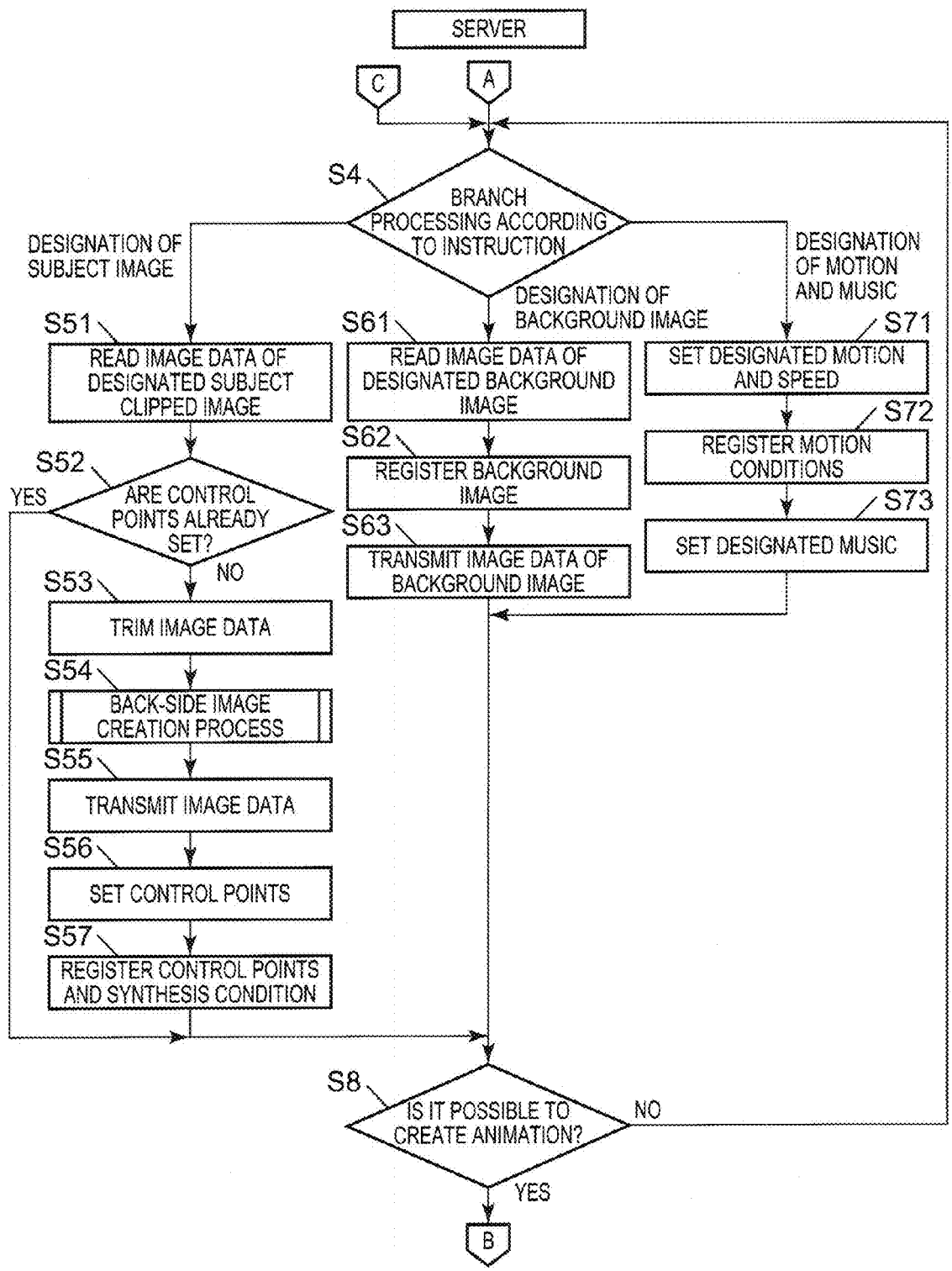
FIG. 5 is a flowchart showing subsequent steps of the animation creation process of FIG. 4.

Herein, FIG. 4 and FIG. 5 are flowcharts showing an example of operations related to the animation creating process.

In the following description, it is assumed that the image data of the subject clipped image P1 (see FIG. 16A), which is created from the image data of the subject existing image, is stored in the storage unit 305 of the server 3.

As shown in FIG. 4, upon receiving an input of an instruction to access the animation creating page, which is to be built by the server 3, the input being made based on a predetermined operation for the operation input unit 202 by the user, the CPU of the central control unit 201 of the user terminal 2 transmits the access instruction to the server 3 through the predetermined communication network N by the communication control unit 206 (Step S1).

When the access instruction, which is transmitted from the user terminal 2, is received by the communication control unit 303 of the server 3, the CPU of the central control unit 301 transmits the page data of the animation creating page to the user terminal 2 through the predetermined communication network N by the communication control unit 303 (Step S2).

Then, when the page data of the animation creating page is received by the communication control unit 206 of the user terminal 2, the display unit 203 displays a screen (not shown) of the animation creating page based on the page data of the animation creating page.

Next, based on a predetermined operation for the operation input unit 202 by the user, the central control unit 201 of the user terminal 2 transmits an instruction signal, which corresponds to each of various buttons operated in the screen of the animation creating page, to the server 3 through the predetermined communication network N by the communication control unit 206 (Step S3).

Figure 6:
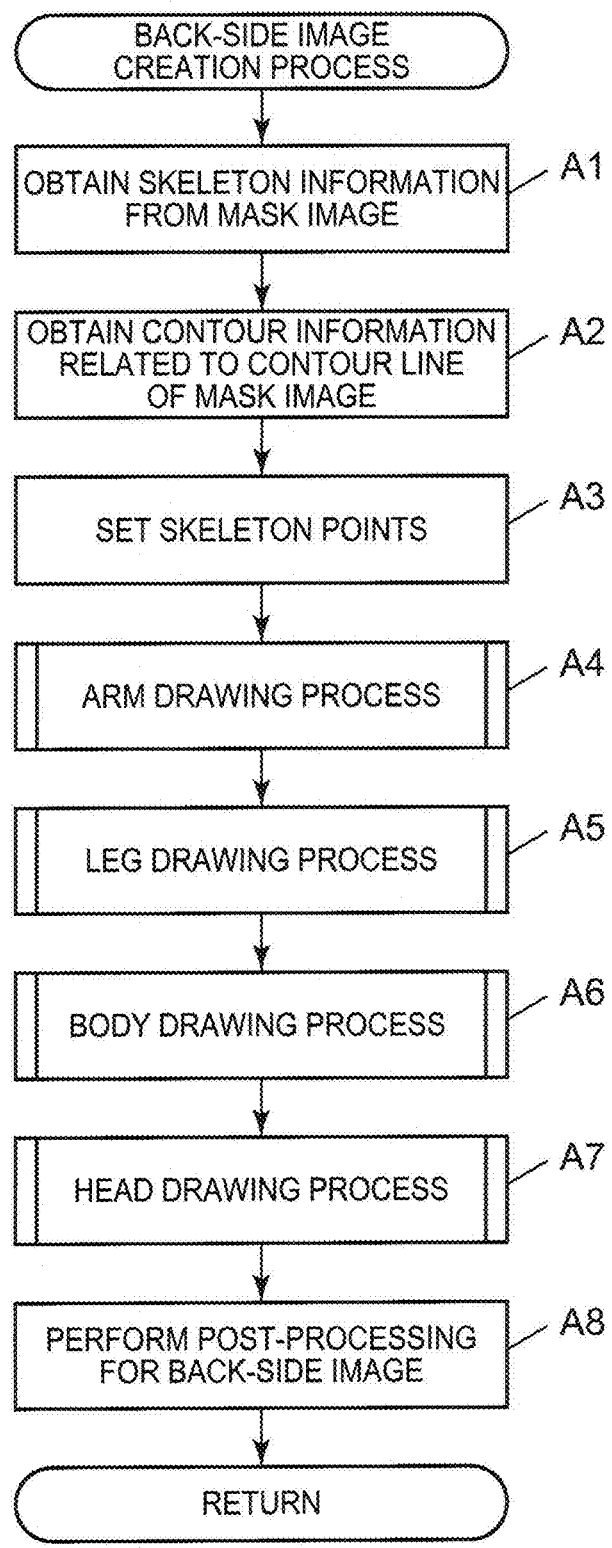
FIG. 6 is a flowchart showing an example of operations related to a back-side image creation process in the animation creation process of FIG. 5.

As shown in FIG. 6, the CPU of the central control unit 301 of the server 3 branches the processing in accordance with the instruction from the server 3 (Step S4). Specifically, in the case where the instruction from the user terminal 2 has contents regarding designation of the subject image (Step S4:

designation of the subject image), the CPU of the central control unit 301 shifts the processing to Step S61. Moreover, in the case where the instruction concerned has contents regarding designation of the background image (Step S4: designation of the background image), the CPU shifts the processing to Step S61. Furthermore, in the case where the instruction concerned has contents regarding designation of the motion and the music (Step S4: designation of the motion and the music), the CPU shifts the processing to Step S71.

<Designation of Subject Image>

In the case where, in Step S4, the instruction from the user terminal 2 has the contents regarding the designation of the subject image (Step S4: designation of the subject image), the image obtaining unit 306a of the animation processing unit 306 reads out and obtains the image data of the subject clipped image P1 designated by the user from image data of subject clipped images P1, which are stored in the storage unit 305 (Step S51).

Next, the control point setting unit 306g determines whether or not the motion control points are already set in the subject image of the obtained subject clipped image P11 (Step S52).

If, it is determined in Step S52 by the control point setting unit 306g that no motion control points are set (Step S52: NO), then based on the image data of the subject clipped image P1, the animation processing unit 306 performs trimming for the subject clipped image P1 based on a predetermined position (for example, a center position or the like) of the subject image, and thereby corrects the subject image and the dynamic model (for example, an animal) so that sizes thereof be equal to each other (Step S53).

Note that the trimming is performed also for the position information such as the alpha map and the mask image P2 which is associated with the image data of the subject clipped image P1.

Thereafter, the animation processing unit 306 performs a back-side image creating process to create the back-side image P3 (see FIG. 21A) that shows the back of the subject image of the image already subjected to the trimming in a pseudo manner (Step S54; see FIG. 6).

Note that the back-side image creating process is described later.

Again in FIG. 6, next, the CPU of the central control unit 301 transmits the image data of the subject clipped image P1, which is associated with the created back-side image P3, to the user terminal 2 through the predetermined communication network N by the communication control unit 303 (Step S55). Thereafter, the control point setting unit 306g sets the plural motion control points corresponding to the plural motion points in the subject image of the subject clipped image P1 (Step S56).

Specifically, the control point setting unit 306g reads out the motion information 305a of the dynamic model (for example, an animal) from the storage unit 305, and in the subject image of the subject clipped image P1, individually sets the motion control points, which correspond to the plural motion point of the reference frame (for example, the first frame or the like) defined in the motion information 305a concerned, at the desired positions designated based on the predetermined operation for the operation input unit 202 of the user terminal 2 by the user.

Then, the animation playing unit 306i registers the plural motion control points set in the subject image concerned and synthesis conditions such as synthesizing position, size, and the like of the subject image in a predetermined storage unit (for example, a predetermined memory or the like) (Step S57).

Thereafter, the CPU of the central control unit 301 shifts the processing to Step S8. Contents of processing of Step S8 will be described later.

Note that, if it is determined in Step S52 that the motion control points are already set (Step S52: YES), the CPU of the central control unit 301 skips Steps S53 to S57 and shifts the processing to Step S8.

<Designation of Background Image>

In the case where, in Step S4, the instruction from the user terminal 2 has the contents regarding the designation of the background image (Step S4: designation of the background image), the animation playing unit 306i of the animation processing unit 306 reads out image data of a desired background image (another image) based on a predetermined operation for the operation input unit 202 by the user (Step S61) and registers the image data of the background image as the background of the animation in the predetermined storage unit (Step S62).

Specifically, a designation instruction to designate any one piece of image data among the plural pieces of image data in the screen of the animation creating page displayed on the display unit 203 of the user terminal 2 is inputted to the server 3 through the communication network N and the communication control unit 303. The aforementioned one piece of image data is designated based on a predetermined operation for the operation input unit 202 by the user. The animation playing unit 306i reads out and obtains image data of the background image related to the designation instruction from the storage unit 305 (Step S61), and thereafter, registers the image data of the background image as the background of the animation.

Next, the CPU of the central control unit 301 transmits the image data of the background image to the user terminal 2 through the predetermined communication network N by the communication control unit 303 (Step S63).

Thereafter, the CPU of the central control unit 301 shifts the processing to Step S8. The contents of the processing of Step S8 will be described later.

<Designation of Motion and Music>

In the case where, in Step S4, the instruction from the user terminal 2 has the contents regarding the designation of the motion and the music (Step S4: designation of the motion and the music), the animation processing unit 306 sets the motion information 305a and the speed of the motion based on a predetermined operation for the operation input unit 202 by the user (Step S71).

Specifically, a designation instruction for any one model name (for example, a hula or the like) among model names of plural motion models in the screen of the animation creating page displayed on the display unit 203 of the user terminal 2 is inputted to the server 3 through the communication network N and the communication control unit 303. The aforementioned one model name is designated based on a predetermined operation for the operation input unit 202 by the user. The animation processing unit 306 sets the motion information 305a, which is associated with the model name of the motion model related to the designation instruction, among the plural pieces of motion information 305a . . . stored in the storage unit 305. Note that, among the plural pieces of motion information 305a . . . , for example, the animation processing unit 306 may be configured to automatically designate the motion information 305a set as a default and the motion information 305a designated previously.

Moreover, a designation instruction for any one speed (for example, standard (same magnification) or the like) among plural motion speeds (for example, ½ time, standard, twice, and the like) in the screen of the animation creating page displayed on the display unit 203 of the user terminal 2 is inputted to the server 3 through the communication network N and the communication control unit 306. The aforementioned one speed is designated based on a predetermined operation for the operation input unit 202 by the user. The animation processing unit 303 sets the speed, which is related to the designation instruction, as the speed of the motion of the subject image.

Thereafter, the animation playing unit 306i of the animation processing unit 306 registers the set motion information 305a and motion speed as conditions of the motion of the animation in the predetermined storage unit (Step S72).

Next, the animation processing unit 306 sets the music, which is to be automatically played, based on a predetermined operation for the operation input unit 202 by the user (Step S73).

Specifically, a designation instruction for any one music name among plural music names in the screen of the animation creating page displayed on the display unit 203 of the user terminal 2 is inputted to the server 3 through the communication network N and the communication control unit 303. The above one music name is designated based on a predetermined operation for the operation input unit 202 by the user. The animation processing unit 306 sets a music having the music name related to the designation instruction.

Thereafter, the CPU of the central control unit 301 shifts the processing to Step S8. The contents of the processing of Step S8 is described later.

In Step S8, the CPU of the central control unit 301 determines whether or not it is possible to create the animation at the current state (Step S8). That is to say, the CPU of the central control unit 301 determines whether the animation processing unit 306 of the server 3 can create the animation as a result of getting prepared to create the animation by performing registration of the motion control points for the subject image, registration of the motion of the subject image, registration of the background image, and the like based on the predetermined operations for the operation input unit 202 by the user.

Herein, if it is determined that it is not possible to create the animation at the current state (Step S8: NO), the CPU of the central control unit 301 returns the processing to Step S4 and branches the processing according to the contents of the instruction from the user terminal 2 (Step S4).

On the other hand, if it is determined that it is possible to create the animation at the current state (Step S8: YES), then as shown in FIG. 4, the CPU of the central control unit 301 shifts the processing to Step S10.

In Step S10, the CPU of the central control unit 301 of the server 3 determines whether or not a preview instruction to preview the animation is inputted based on a predetermined operation for the operation input unit 202 of the user terminal 2 by the user (Step S10).

That is to say, in Step S9, the central control unit 201 of the user terminal 2 transmits the preview instruction for the animation, which is inputted based on the predetermined operation for the operation input unit 202 by the user, to the server 3 through the predetermined communication network N by the communication control unit 206 (Step S9).

If the CPU of the central control unit 301 of the server 3 determines in Step S10 that the preview instruction for the animation is inputted (Step S10: YES), the animation playing unit 306i of the animation processing unit 306 registers, in the predetermined storage unit, the music information 305b, which corresponds to the already set music name, as the information to be automatically played together with the animation (Step S11).

Next, the animation processing unit 306 starts to play the predetermined music by the animation playing unit 306i based on the music information 305c registered in the storage unit and starts to create plural frame images constituting the animation by the frame creating unit 306h (Step S12).

Subsequently, the animation processing unit 306 determines whether or not such playing of the predetermined music by the animation playing unit 306i is finished (Step S13).

Herein, if it is determined that the playing of the music is not finished (Step S13: NO), the frame creating unit 306h of the animation processing unit 306 creates the reference frame images of the subject image deformed according to the motion information 305a (Step S14). Specifically, the frame creating unit 306h individually obtains the coordinate information of plural motion points which move at predetermined time intervals according to the motion information 305a registered in the storage unit and calculates the coordinates of the motion control points corresponding to the respective motion points. The frame creating unit 306h sequentially moves the motion control points to the calculated coordinates and moves and deforms a predetermined image region set in the subject image according to the movement of the motion control points, thus creating the reference frame images.

The animation processing unit 306 synthesizes the reference frame images and the background images using a publicly known image synthesizing method. Specifically, for example, among the pixels of a background image, the animation processing unit 306 allows the pixels having an alpha value of "0" to be transparent and overwrites the pixels having an alpha value of "1" by pixel values of the corresponding pixels of the reference frame image. Moreover, among the respective pixels of the background image, for the pixels with the alpha value of "0<α<1", the animation processing unit 306 uses a complement (1−α) of 1 to create an image (background image×(1−α)), in which the subject region Ps of the reference frame image is clipped, thereafter, calculates a value obtained by blending the reference frame image with the single background color in the event of creating the reference frame image concerned by using the complement (1−α) of 1 in the alpha map, subtracts the calculated value from the reference frame image, and synthesizes a subtraction resultant with the image (background image×(1−α)) from which the subject region is clipped.

Subsequently, according to the playing progress of the predetermined music, which is played by the animation playing unit 306i, the frame creating unit 306h creates the interpolation frame image that interpolates between two reference frame images adjacent to each other (Step S15). Specifically, the frame creating unit 306h constantly obtains the playing progress of the predetermined music, which is played by the animation playing unit 306i, between the adjacent two reference frame images and, in accordance with the obtained progress, sequentially creates the interpolation frame images played between the adjacent two reference images and the background images.

Moreover, the animation processing unit 306 synthesizes the interpolation frame image and the background image by using a publicly known image synthesis method in a similar way to the case of the foregoing reference frame images Next, together with the music information 305c of the music to be automatically played by the animation playing unit 306i, the CPU of the central control unit 301 transmits data of a preview animation, which is composed of the reference frame images and the interpolation frame images that are played at predetermined timing of the music, to the user terminal 2 through the predetermined communication network N by the communication control unit 303 (Step S16). Herein, the data of the preview animation composes an animation in which plural frame images including a predetermined number of the reference frame images and a predetermined number of the interpolation frame images and the background images desired by the user are synthesized with each other.

Next, the animation processing unit 306 returns the processing to Step S18 and determines whether or not the playing of the music is finished (Step S13).

The foregoing processing is repeatedly executed until it is determined in Step S13 that the playing of the music is finished (Step S13: YES).

Then, if it is determined that the playing of the music is finished (Step S13: YES), as shown in FIG. 5, the CPU of the central control unit 301 returns the processing to Step S4 and branches the processing in accordance with the instruction from the user terminal 2 (Step S4).

When the data of the preview animation transmitted from the server 3 is received by the communication control unit of the user terminal 2, the CPU of the central control unit 201 controls the sound output unit 204 and the display unit 203 to play the preview animation (Step S17).

Specifically, the sound output unit 204 automatically plays the music and emits the sound from the speaker based on the music information 305b. The display unit 203 displays the preview of the moving image, which is composed of the reference frame images and the interpolation frame images, on the display screen at the predetermined timing of the music which is being automatically played.

Note that, in the animation creating process described above, the preview animation is played; however, the playing of the preview animation is merely an example, and the playing target of the present invention is not limited to this. For example, the image data of the reference frame images and the interpolation frame images, which are sequentially created, the image data of the background image, and the music information 305c may be integrated as one file and are stored in the predetermined storage unit. After the creation of all the data related to the animation is completed, the file is transmitted from the server 3 to the user terminal 2 to be played in the user terminal 2.

<Back-Side Image Creating>

A description is given below in detail of the back-side image creating process by the animation processing unit 306 with reference to FIGS. 6 to 15.

FIG. 6 is a flowchart showing an example of operations related to the back-side image creating process in the operation creating process.

As shown in FIG. 6, first, the image obtaining unit 306a of the animation processing unit 306 obtains the image data of the mask image P2, which is associated with the image data of the subject clipped image P1 created by the subject clipping unit 304. The skeleton information obtaining unit 306b then creates and obtains the skeleton information from the obtained image data (Step A1).

Specifically, the skeleton information obtaining unit 306b performs thinning for the image data of the mask image P2, which indicates the position of the subject region Ps in the subject clipped image P1 and is obtained by the image obtaining unit 306a, to create a skeleton line image (not shown) and obtain the skeleton line image as the skeleton information. Herein, the thinning refers to processing creating an image with lines with a width of, for example, one pixel.

Next, the contour information obtaining unit 306c specifies the respective pixels constituting the contour line of the subject region of the mask image 2 based on the image data of the mask image P2 obtained by the image obtaining unit 306a and obtains the contour information related to the coordinates of the respective pixels specified (Step A2).

Subsequently, in consideration of the shape of the skeleton line image of the subject, the human joint positions, and the like, the skeleton point setting unit 306d specifies plural skeleton points B at respective positions corresponding to the representative human parts in the skeleton line image. The skeleton point setting unit 306d then sets the plural skeleton points B . . . at the corresponding positions in the subject clipped image P1 and mask image P2 (Step A3). For example, the skeleton point setting unit 306d, in the skeleton line image, the left and right shoulder skeleton points B1 and B2, the left and right elbow skeleton points B3 and B4, the left and right wrist skeleton points B5 and B6, the left and right hand skeleton points B7 and B8, the left and right hip joint skeleton points B9 and B10, the left and right knee skeleton points B11 and B12, the left and right ankle skeleton points B13 and B14, the left and right toe skeleton points B15 and B16, the chin skeleton point B17, the head top skeleton point B18, and the like (see FIGS. 16A and 16B) and sets these skeleton points B at the respective positions (coordinates) in the subject clipped image P1 and mask image p2.

Next, the animation processing unit 306 performs the arm drawing process (see FIG. 7) to draw the portion P3a corresponding to each arm (see FIG. 17C) in the subject correspondent region Pa of the mask image P2 (the back-side image P3), which corresponds to the subject region Ps (the region shown white in FIG. 16B) of the subject clipped image P1 (Step A4).

The arm drawing process is described later.

Subsequently, the animation processing unit 306 performs the leg drawing process (see FIG. 11) to draw the portion corresponding to each leg in the subject correspondent region Pa of the mask image P2 (the back-side image P3) (Step A5).

The leg drawing process is described later.

Next, the animation processing unit 306 performs the body drawing process (see FIG. 12) to draw the portion P3b corresponding to the body (see FIG. 19C) in the subject correspondent region Pa of the mask image P2 (the back-side image P3) (Step A6).

The body drawing process is described later.

Subsequently, the animation processing unit 306 performs the head drawing process (see FIG. 13) to draw the portion P3c corresponding to the head (see FIG. 20C) in the subject correspondent region Pa of the mask image P2 (the back-side image P3) (Step A7).

The head drawing process is described later.

Thereafter, the animation processing unit 306 performs post-processing for the mask image P2 which is already subjected to the head drawing process, that is, the back-side image P3 (see FIG. 21A) (Step A8) and then terminates the back-side image creating process.

Herein, the post-processing refers to processing to obscure the linearly drawn pattern in the back-side image P3, and an example thereof is applying a bilateral filter to the image data of the back-side image P3. In the back-side image P3, therefore, the pixel values in regions including close color information are equalized to the surrounding pixel values, and the pixel values in regions different in color information are maintained. Accordingly, the back-side image P3d (see FIG. 21B) after the post-processing can be an expression form which includes natural color gradation and hardly gives the viewer a feeling of strangeness.

<Arm Drawing Process>

A description is given in detail below of the arm drawing process with reference to FIGS. 7 to 10.

Figure 7:
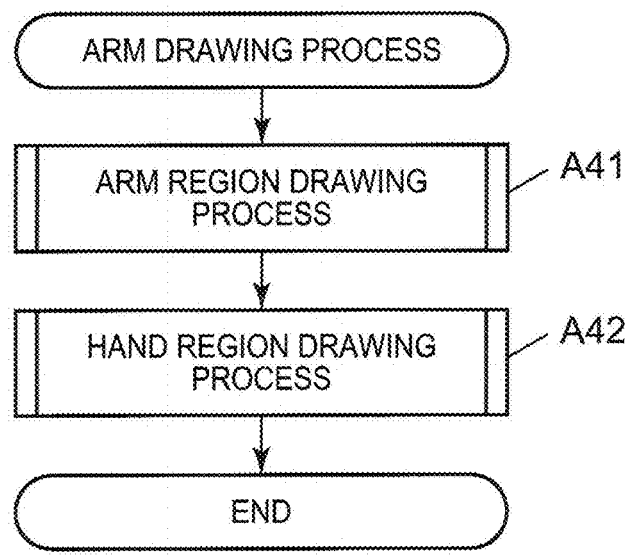
FIG. 7 is a flowchart showing an example of operations related to an arm drawing process in the back-side image creation process of FIG. 6.

FIG. 7 is a flowchart showing an example of operations related to the arm drawing process in the back-side image creating process.

As shown in FIG. 7, first, the animation processing unit 306 performs the arm region drawing process (see FIG. 8) to draw the region of the arm body among the portion P3a corresponding to each arm in the subject correspondent region Pa of the mask image P2 (Step A41). The animation processing unit 306 then performs the hand region drawing process (see FIG. 9) to draw the region of the hand (Step A42).

<Arm Region Drawing Process>

A description is given below in detail of the arm region drawing process with reference to FIG. 8.

Figure 8:
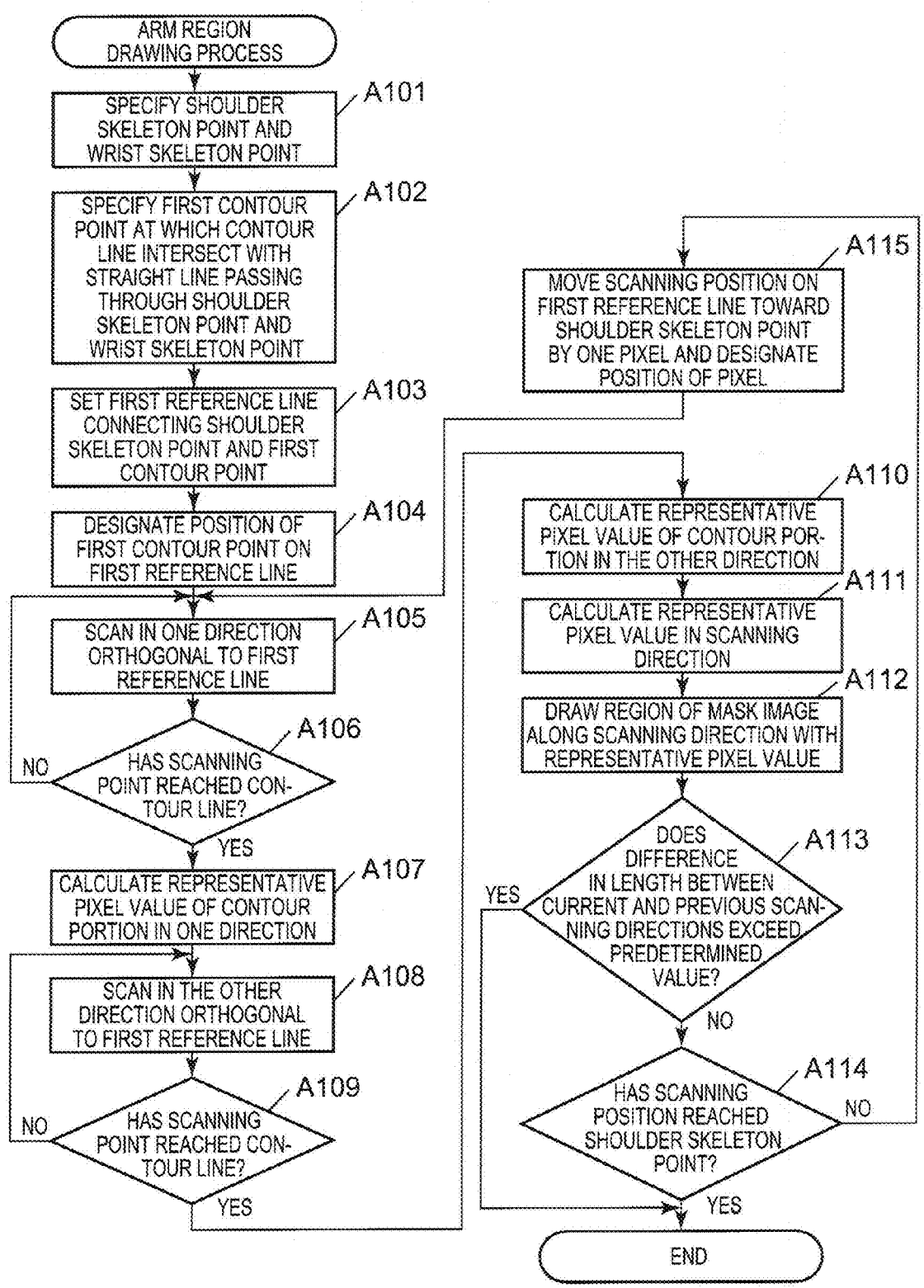
FIG. 8 is a flowchart showing an example of operations related to an arm region drawing process in the arm drawing process of FIG. 7.

FIG. 8 is a flowchart showing an example of operations related to the arm region drawing process.

Herein, the arm region drawing process is a process individually performed for the left and right arms. The following description is given for the right arm by way of example, but the same process is performed for the left arm after the process related to the right arm.

As shown in FIG. 8, the first specifying unit e1 of the color specifying unit 306e first specifies the right shoulder skeleton point B2 and the right wrist skeleton point B6, which are set by the skeleton point setting unit 306d, in the subject clipped image P1 and the mask image P2 (Step A101).

Next, the first specifying unit e1 specifies a straight line extending from the right shoulder skeleton point B2 through the right wrist skeleton point B6 to the hand tip side and then specifies the first contour point C1, at which the contour line intersects with the specified straight line, based on the contour information obtained by the contour information obtaining unit 306c (Step A102). The first specifying unit e1 sets the line segment connecting the right shoulder skeleton point B2 and the first contour point C1 as the first reference line L1 in the mask image P2 (Step A103).

Subsequently, the first specifying unit e1 specifies the position (coordinates) of the first contour point C1 on the first reference line L1 in the mask image P2 (Step A104) and then scans in a predetermined one of the two directions orthogonal to the first reference line L1 (for example, in the upward direction of FIG. 17B) one pixel by one pixel (Step A105).

The first specifying unit e1 then determines whether the scanning position reaches the contour line of the portion corresponding to the right arm in the subject region Ps on one side (Step A106). If it is determined that the scanning position has reached the contour line (Step A106; YES), the first specifying unit e1 obtains the coordinates of the point of interest on the contour line in the mask image P2. The first specifying unit e1 then, based on the arm image P1a of the subject clipped image P1 (see FIG. 17A), calculates the representative value (for example, the average) of the pixel values of the point of interest on the contour line and a predetermined number of pixels adjacent to the point of interest on the contour line (Step A107).

Next, the first specifying unit e1 scans in increments one pixel by one pixel in the other one of the two directions orthogonal to the first reference line 11 (for example, in the downward direction of FIG. 17B) (Step A108).

The first specifying unit e1 then determines whether the scanning position reaches the contour line of the portion corresponding to the right arm in the subject region Ps on the other side (Step A109). If it is determined that the scanning position has reached the contour line (Step A109; YES), the first specifying unit e1 obtains the coordinates of the point of interest on the contour line in the mask image P2. The first specifying unit e1 then, based on the arm image P1a of the subject clipped image P1 (see FIG. 17A), calculates the representative value (for example, the average) of the pixel values of the point of interest on the contour line and a predetermined number of pixels adjacent to the point of interest on the contour line (Step A110).

Next, based on the representative value of the pixel values calculated for the respective directions of the two directions orthogonal to the first reference line L1, the first specifying unit e1 calculates a representative pixel value (for example, the average) of the scanning position of the first reference line L1 (Step A111).

Subsequently, among the portion P3a corresponding to the right arm in the subject correspondent region Pa of the mask image P2 (back-side image P3), the back-side image creating unit 306f draws a region of the first reference line L1 which is composed of a predetermined number of pixels along the scanning direction with the representative pixel value calculated by the first specifying unit e1 (Step A112).

Next, the first specifying unit e1 determines for the respective directions of the two direction orthogonal to the first reference line L1, whether or not the difference between the length of the region composed of the predetermined number of pixels along the current scanning direction and the length of the region composed of the predetermined number of pixels along the previous scanning direction exceeds a predetermined value (Step A113).

Specifically, the first specifying unit e1 determines whether or not the forgoing difference exceeds the predetermined value depending on whether or not the region composed of the predetermined number of pixels along the current scanning direction is longer than the predetermined proportion of the length of the region composed of the predetermined number of pixels along the previous scanning direction.

If it is determined in Step A113 that the foregoing difference does not exceed the predetermined value (Step A113; NO), the first specifying unit e1 determines whether or not the scanning position on the first reference line L1 has reached the right shoulder skeleton point B2 (Step A114).

Herein, if it is determined that the scanning position has not reached the right shoulder skeleton point B2 (Step A114; NO), the first specifying unit e1 moves the scanning position on the first reference line L1 toward the right shoulder skeleton point B2 by one pixel and designates the position (coordinates) of the pixel of interest (Step A115). The first specifying unit e1 then shifts the processing to the step A105.

Thereafter, the animation processing unit 306 sequentially repeats the processing of Step A105 and the subsequent steps until it is determined in Step A114 that the scanning position has reached the right shoulder skeleton point B2 (Step A114; YES). In such a manner, the portion corresponding to the arm body of the human right arm in the mask image P2 (back-side image P3) is drawn at each scan on a basis of the first reference line L1.

If it is determined in Step A114 that the scanning position on the first reference line L1 has reached the right shoulder skeleton point B2 (Step A114; YES), the animation processing unit 306 terminates the arm region drawing process.

Also in the case where it is determined in Step A113 that the difference exceeds the predetermined value (A113; YES), the animation processing unit 306 ends the arm region drawing process.

<Hand Region Drawing Process>

A description is given below in detail of the hand region drawing process with reference to FIGS. 9 and 10.

Figure 9:
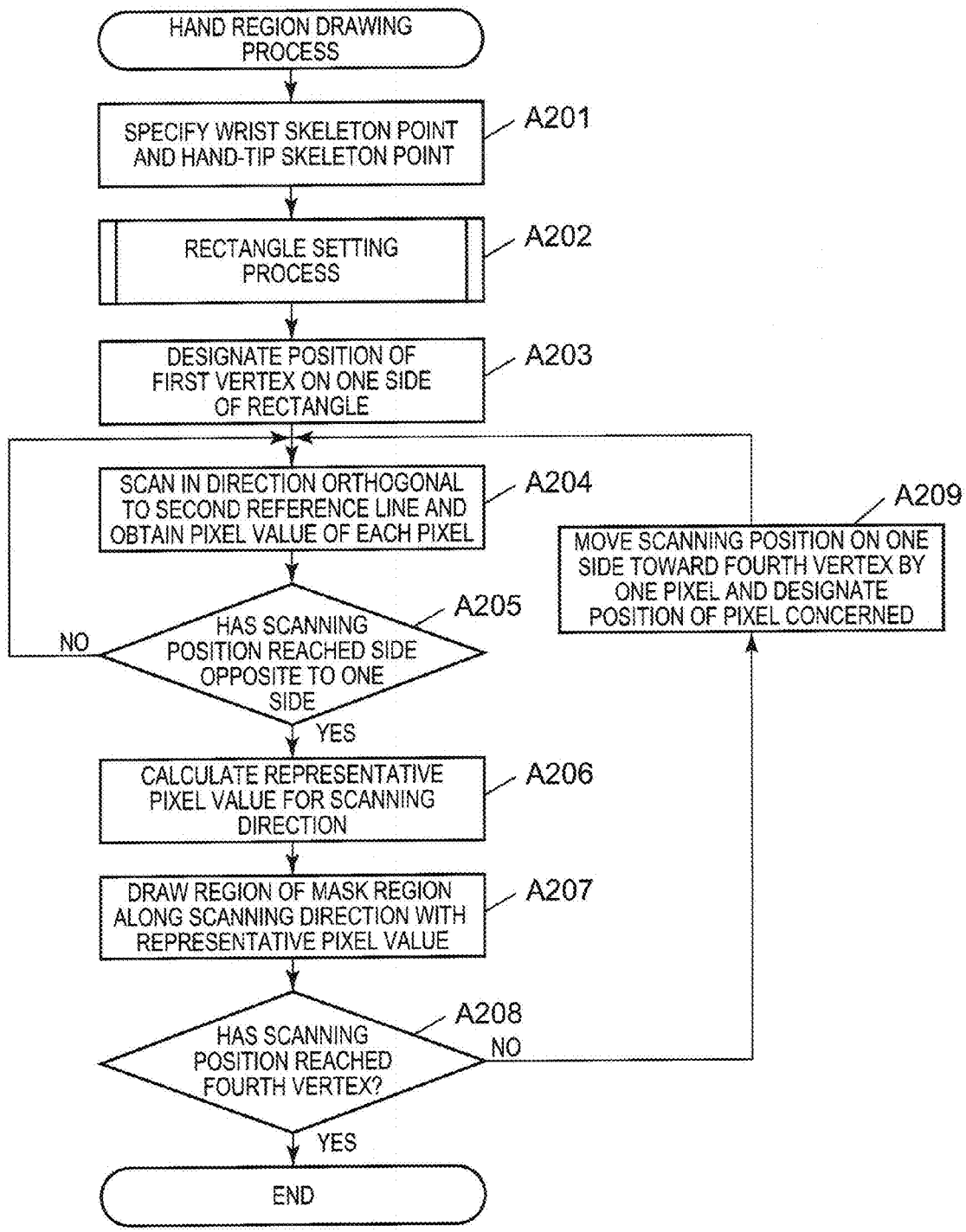
FIG. 9 is a flowchart showing an example of operations related to a hand region drawing process in the arm drawing process of FIG. 7.

FIG. 9 is a flowchart showing an example of operations related to the hand region drawing process. FIG. 10 is a flowchart showing an example of operations related to the rectangle setting process of the hand region drawing process.

Herein, the hand region drawing process is a process individually performed for the left and right hands. The following description is given of the right hand by way of example, but the same processing is performed for the left hand after the processing concerning the right hand.

As shown in FIG. 9, the first specifying unit e1 of the color specifying unit 306e first specifies the right wrist skeleton point B6 and the right hand tip skeleton point B8, which are set by the skeleton point setting unit 306d, in the subject clipped image P1 and the mask image P2 (Step A201).

Next, the first specifying unit e1 performs the rectangle setting process (see FIG. 10) to set the rectangle R1 surrounding the portion corresponding to the human hand (for example, P2a1 of the mask image P2 or the like) in each of the subject clipped image P1 and mask image P2 (Step A202).

Figure 10:
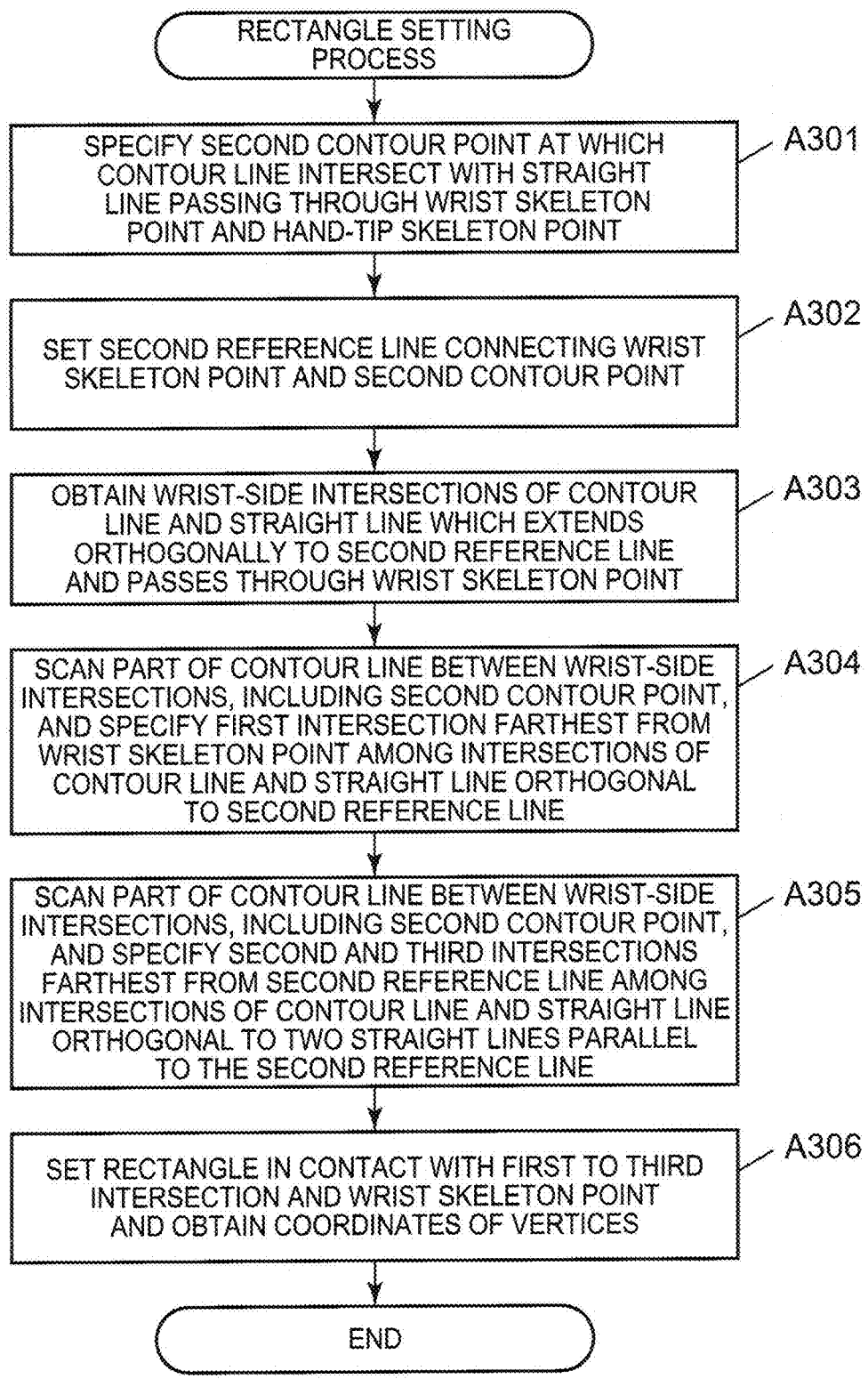
FIG. 10 is a flowchart showing an example of operations related to a rectangle setting process in the hand region drawing process of FIG. 9.

Herein, a description is given in detail of the rectangle setting process with reference to FIG. 10.

As shown in FIG. 10, the first specifying unit e1 sets a straight line extending from the right wrist skeleton point B6 through the right hand tip skeleton point B8 on the hand tip side and then based on the contour information obtained by the contour information obtaining unit 306c, specifies the second contour point C2 at which the contour line intersects with the straight line (Step A301). The first specifying unit e1 sets a line segment connecting the right wrist skeleton point B6 and the second contour point C2 in the mask image 2 as a second reference line L2 (Step A302).

Next, based on the contour information, the first specifying unit e1 obtains the coordinates of two wrist-side points which are located on the contour line of the portion corresponding to the right hand of the subject region of the mask image P2 and are intersections of the contour line and the straight line which extends orthogonal to the second reference line L2 and passes through the right wrist skeleton point B6 (Step A303).

Subsequently, the first specifying unit e1 scans part of the contour line between the two wrist-side intersections, including the second contour point C2, in the portion corresponding to the right hand in the subject region of the mask image P2 and, based on the contour information, specifies the first intersection D1 which is the farthest from the right wrist skeleton point B6 among the intersections of the contour line and the straight line orthogonal to the second reference line L2 (Step A304). Next, the first specifying unit e1 scans part of the contour line between the two wrist-side intersections, including the second contour point C2, in the portion corresponding to the right hand in the subject region of the mask image P and, based on the contour information, specifies the second and third intersections D2 and D3 which are the farthest from the second reference line L2 in the orthogonal direction among the intersections of the contour line and two straight lines extended on both side of the second reference line Ls in parallel to the same (Step A305)

Thereafter, the first specifying unit e1 sets the rectangle R1 in the mask image P2 so that the rectangle R1 be in contact with the first to third intersections D1 to D3 and the right wrist skeleton point B6 and obtains the coordinates of the first to fourth vertices F1 to F4 of the rectangle R1 (Step A306).

The rectangle setting process is thus terminated.

Again in FIG. 9, the first specifying unit e1 specifies the position (coordinates) of the first vertex F on a side connecting the first and fourth vertices F1 and F3 of the rectangle R1 in the hand image P2a1 of the mask image P2 (see FIG. 18B) (Step A203).

Thereafter, the first specifying unit e1 scans in the direction orthogonal to the one side connecting the first and fourth vertices F1 and F4 (for example, in the vertical direction of FIG. 18B) one pixel by one pixel and then obtains the pixel value of each pixel of the part of the subject region Ps (the portion corresponding to the human hand or foot) existing within the rectangle R1 in the hand image P1a1 (see FIG. 18A) of the subject clipped image P1 (Step A204).

Next, the first specifying unit e1 determines whether or not the scanning position has reached a side (a side connecting the second and third vertices F2 and F3) opposite to the foregoing one side of the rectangle R1 (Step A205). Herein, if it is determined that the scanning potion has reached the opposite side (Step A205; YES), the first specifying unit e1 calculates the representative pixel value (for example, the average) of the scanning position on the one side based on the obtained pixel values of the respective pixels (Step A206).

Subsequently, among the portion P3a1 corresponding to the right hand in the subject correspondent region Pa of the mask image P2 (back-side image P3), the back-side image creating unit 306f draws a region composed of a predetermined number of pixels along the scanning direction, with the representative pixel values calculated by the first specifying unit e1 (Step A207).

Next, the first specifying unit e1 determines whether or not the scanning position on the one side has reached the fourth vertex F4 (Step A208).

Herein, if it is determined that the scanning position has not reached the fourth vertex F4 (Step A208; NO), the first specifying unit e1 moves the scanning position on the one side toward the fourth vertex F4 by one pixel and designates the position (coordinates) of the pixel of interest (Step A209). The first specifying unit e1 then shifts the processing to Step A204.

Thereafter, the animation processing unit 306 sequentially repeats the processing of Step A204 and the subsequent steps until it is determined in Step A208 that the scanning position has reached the fourth vertex F4 (Step A208; YES). In such a manner, the portion P3a1 corresponding to the human right hand in the mask image P2 (back-side image P3) is drawn at each scan on a basis of the one side.

If it is determined in Step A208 that the scanning position on the one side has reached the fourth vertex F4 (Step A208; YES), the animation processing unit 306 terminates the hand region drawing process.

<Leg Drawing Process>

A description is given below in detail of the leg region drawing process with reference to FIG. 11.

Figure 11:
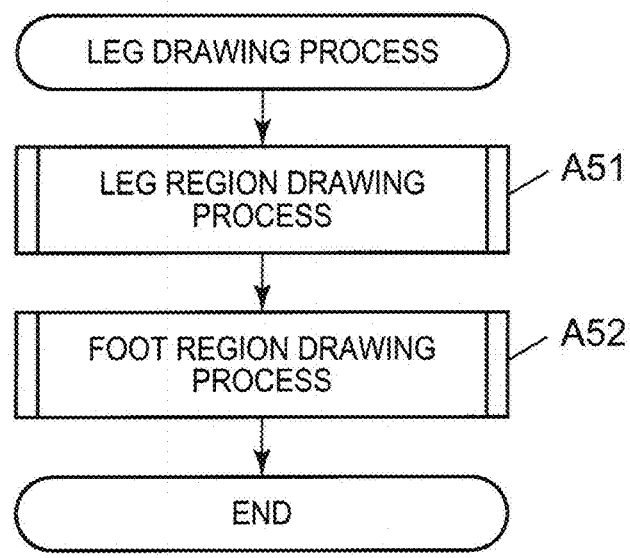
FIG. 11 is a flowchart showing an example of operations related to a leg drawing process in the back-side image creation process of FIG. 6.

FIG. 11 is a flowchart showing an example of operations related to the leg region drawing process of the back-side image creating process.

As shown in FIG. 11, first, the animation processing unit 306 performs the leg region drawing process to draw the region of the leg body among the portion corresponding to each of the left and right legs of the subject correspondent region Pa in the mask image P2 (back-side image P3) (Step A51) and then performs the foot region drawing processing to draw the region of the foot (Step A52).

The leg region drawing process and foot region drawing process of the leg drawing process are the substantially same as the aforementioned arm region drawing process and hand region drawing process of the arm drawing process, respectively, and the detailed description thereof are omitted.

<Body Drawing Process>

A description is given below in detail of the body drawing process with reference to FIG. 12.

Figure 12:
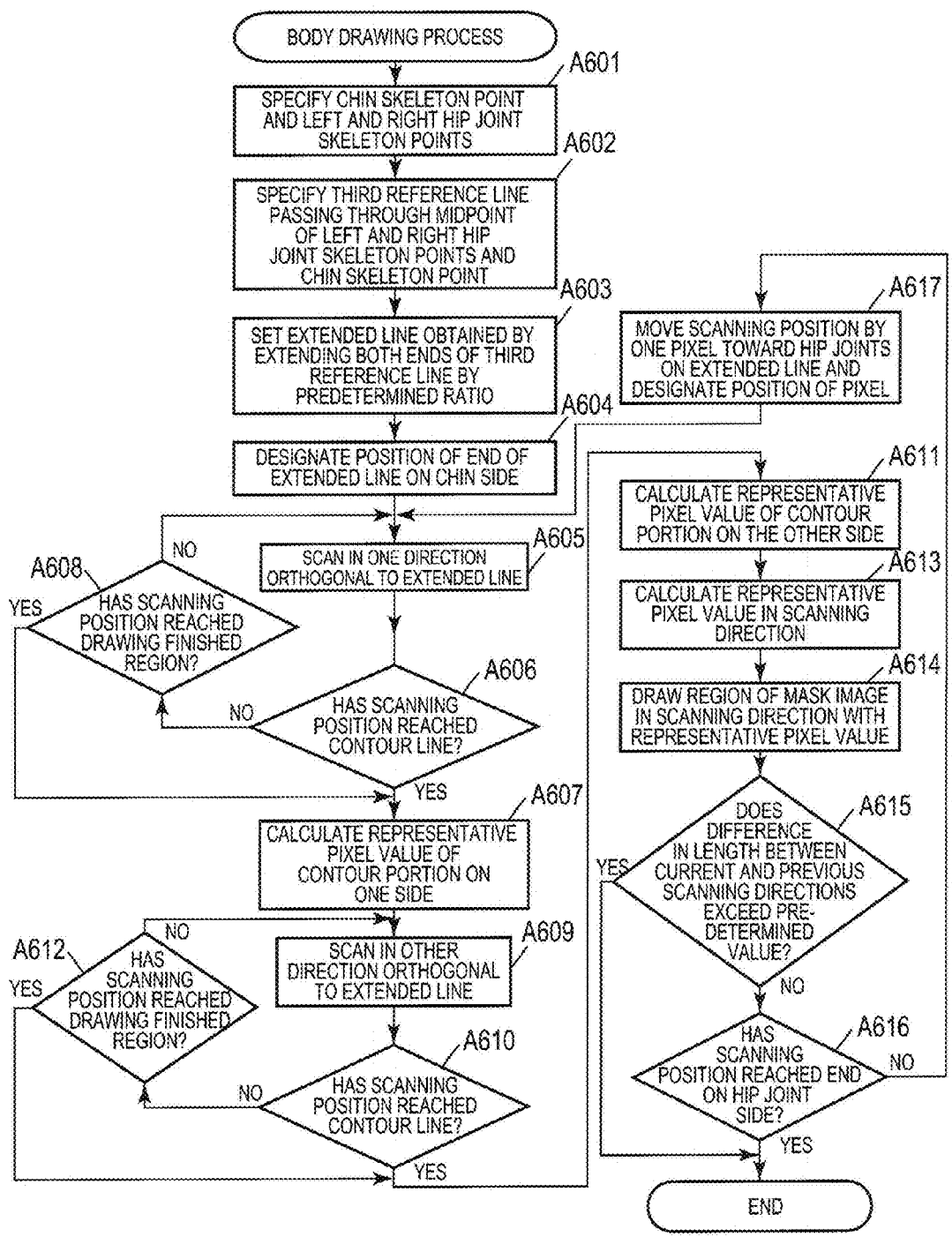
FIG. 12 is a flowchart showing an example of operations related to a body drawing process in the back-side image creation process of FIG. 6.

FIG. 12 is a flowchart showing an example of operations related to the body drawing process of the back-side mage creating process.

As shown in FIG. 12, the second specifying unit e2 of the color specifying unit 306e first specifies the chin skeleton point B17 and the left and right hip joint skeleton points B9 and B10, which are set by the skeleton point setting unit 306d, in the subject clipped image P1 and the mask image P2 (Step A601).

Next, the second specifying unit e2 specifies a midpoint Bm between the left and right hip skeleton points B9 and B10 and then specifies the third reference line L3, which connects the midpoint Bm and the chin skeleton point B17, in the mask image P2 (Step A602). Subsequently, the second specifying unit e2 sets the extended line L3a, which is obtained by extending the third reference line L3 at the both ends each by ten percent in the extending direction of the reference line L3 (Step A603).

Subsequently, the second specifying unit e2 designates the position (coordinates) of an end of the extended line L3a on the chin side in the mask image P2 (Step A604), and then scans in the predetermined one of the two directions orthogonal to the extended line L3a (for example, in the left direction of FIG. 19B) one pixel by one pixel (Step A605).

The second specifying unit e2 determines whether or not the scanning position has reached the contour line on one side of the portion corresponding to the body in the subject region Ps (Step A606). Herein, if it is determined that the scanning position has reached the contour line (Step A606; YES), the second specifying unit e2 obtains the coordinates of the point on the contour line in the mask image P2, and then based on the body image P1b (see FIG. 19A) of the subject clipped image P1, calculates the representative value (the average value) of the pixel values of the point of interest on the contour line and the predetermined number of pixels adjacent to the point of interest on the contour line (Step A607).

On the other hand, if it is determined in Step A606 that the scanning position has not reached the contour line (Step A606; NO), the second specifying unit e2 determines whether or not the scanning position has reached any one of the drawing finished regions A of the arms and legs (Step A608).

Herein, if it is determined that the scanning position has reached one of the drawing finished regions A of the arms and legs (Step A608; YES), the second specifying unit e2 shifts the processing to Step A607 and obtains the coordinates of the pixel inside of the predetermined pixel of the drawing finished region A in the mask image P2. Thereafter, based on the body image P1b (see FIG. 19A) of the subject clipped image P1, the second specifying unit e2 calculates the representative value of the pixel value of the pixel inside of the predetermined pixel of the drawing finished region A and the pixel values of the predetermined number of pixels adjacent to the pixel of interest (Step A607).

Subsequently, the second specifying unit e2 scans in the other one of the two directions orthogonal to the extended line L3a (for example, in the downward direction of FIG. 19B) one pixel by one pixel (Step A609).

The second specifying unit e2 then determines whether or not the scanning position has reached the contour line of the portion corresponding to the body in the subject region Ps on the other side (Step A610). Herein, if it is determined that the scanning position has reached the contour line (Step A610; YES), the second specifying unit e2 obtains the coordinates of the point on the contour line in the mask image P2, and then based on the body image P1b (see FIG. 19A) of the subject clipped image P1, calculates the representative value of the pixel value of the point of interest on the contour line and the predetermined number of pixels adjacent to the point of interest on the contour line (Step A611).

On the other hand, if it is determined in Step A610 that the scanning position has not reached the contour line (Step A610; NO), the second specifying unit e2 determines whether or not the scanning position has reached any one of the drawing finished regions A of the arms and legs (Step A612).

Herein, if it is determined that the scanning position has reached one of the drawing finished regions A of the arms and legs (Step A612; YES), the second specifying unit e2 shifts the processing to Step A611 and obtains the coordinates of the pixel positioned short of the predetermined pixel of the drawing finished region A in the mask image P2. Thereafter, based on the body image P1b (see FIG. 19A) of the subject clipped image P1, the second specifying unit e2 calculates the representative value of the pixel values of the pixel positioned short of the predetermined pixel of the drawing finished region A and the predetermined number of pixels adjacent to the pixel of interest (Step A611).

Thereafter, based on the representative value of the pixel values calculated for the respective directions of the two directions orthogonal to the extended line L3a, the second specifying unit e2 calculates the representative pixel value (for example, the average) of the scanning position of the extended line L3a (Step A613).

Subsequently, among the portion P3b corresponding to the body in the subject correspondent region Pa of the mask image P2 (back-side image P3), the back-side image creating unit 306f draws a region composed of a predetermined number of pixels along the scanning direction of the extended line L3a with the representative pixel value calculated by the second specifying unit e2 (Step A614).

Next, the second specifying unit e2 determines for the respective directions of the two direction orthogonal to the extended line L3a, whether or not the difference in length between the region composed of the predetermined number of pixels along the current scanning direction and the region composed of the predetermined number of pixels along the previous scanning direction exceeds a predetermined value (Step A615).

Specifically, the second specifying unit e2 determines whether or not the foregoing difference exceeds the predetermined value depending on whether or not the region composed of the predetermined number of pixels along the current scanning direction is longer than the predetermined proportion of the length of the region composed of the predetermined number of pixels along the previous scanning direction.

If it is determined in Step A615 that the difference does not exceed the predetermined value (Step A615; NO), the second specifying unit e2 determines whether or not the scanning position on the extended line L3a has reached the end on the hip joint side (Step A616).

Herein, if it is determined that the scanning position has not reached the end on the hip joint side (Step A616; NO), the second specifying unit e2 moves the scanning position on the extended line L3a toward the hip joint by one pixel and designates the position (coordinates) of the pixel of interest (Step A617). The second specifying unit e2 then shifts the processing to Step A605.

Thereafter, the animation processing unit 306 sequentially repeats the processing of Step A605 and the subsequent steps until it is determined in Step A616 that the scanning position has reached the end on the hip joint side (Step A616; YES). In such a manner, the portion P3b corresponding to the human body in the mask image P2 (back-side image P3) is drawn at each scan on a basis of the extended line L3a.

If it is determined in Step A616 that the scanning position on the extended line L3 has reached the end of the hip joint side (Step A616; YES), the animation processing unit 306 terminates the body region drawing process.

Also in the case where it is determined in Step A615 that the foregoing difference exceeds the predetermined value (A615; YES), the animation processing unit 306 terminates the body region drawing process.

<Head Drawing Process>

A description is given in detail below of the head drawing process with reference to FIGS. 13 to 15.

Figure 13:
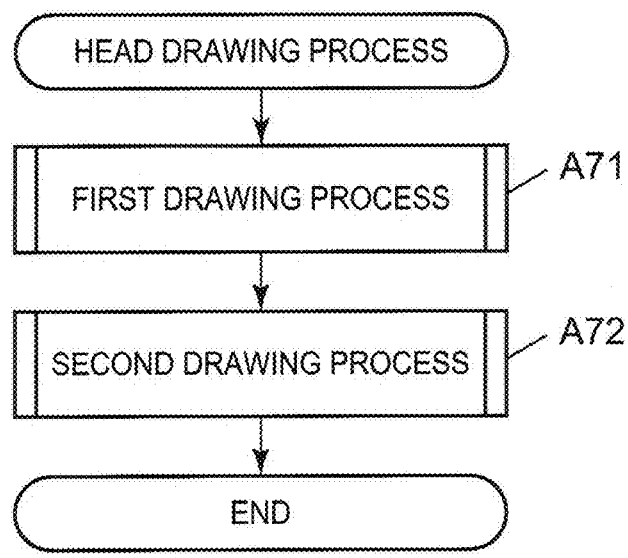
FIG. 13 is a flowchart showing an example of operations related to a head drawing process in the back-side image creation process of FIG. 6.

FIG. 13 is a flowchart showing an example of operations related to the head drawing process of the back-side image creating process.

As shown in FIG. 13, the animation processing unit 306 performs the first drawing process (see FIG. 14) to draw the portion P3c corresponding to the head in the subject correspondent region Pa of the mask image P2 (back-side image P3) in the direction orthogonal to the reference line L (for example, the four reference line L4) (Step A71) and then performs the second drawing process (see FIG. 15) to draw the part of the portion corresponding to the head which exists in the rectangle R2 in the subject correspondent region Pa of the mask image P2 (back-side image P3) (Step A72).

<First Drawing Process>

A description is given below in detail of the first drawing process with reference to FIG. 14.

Figure 14:
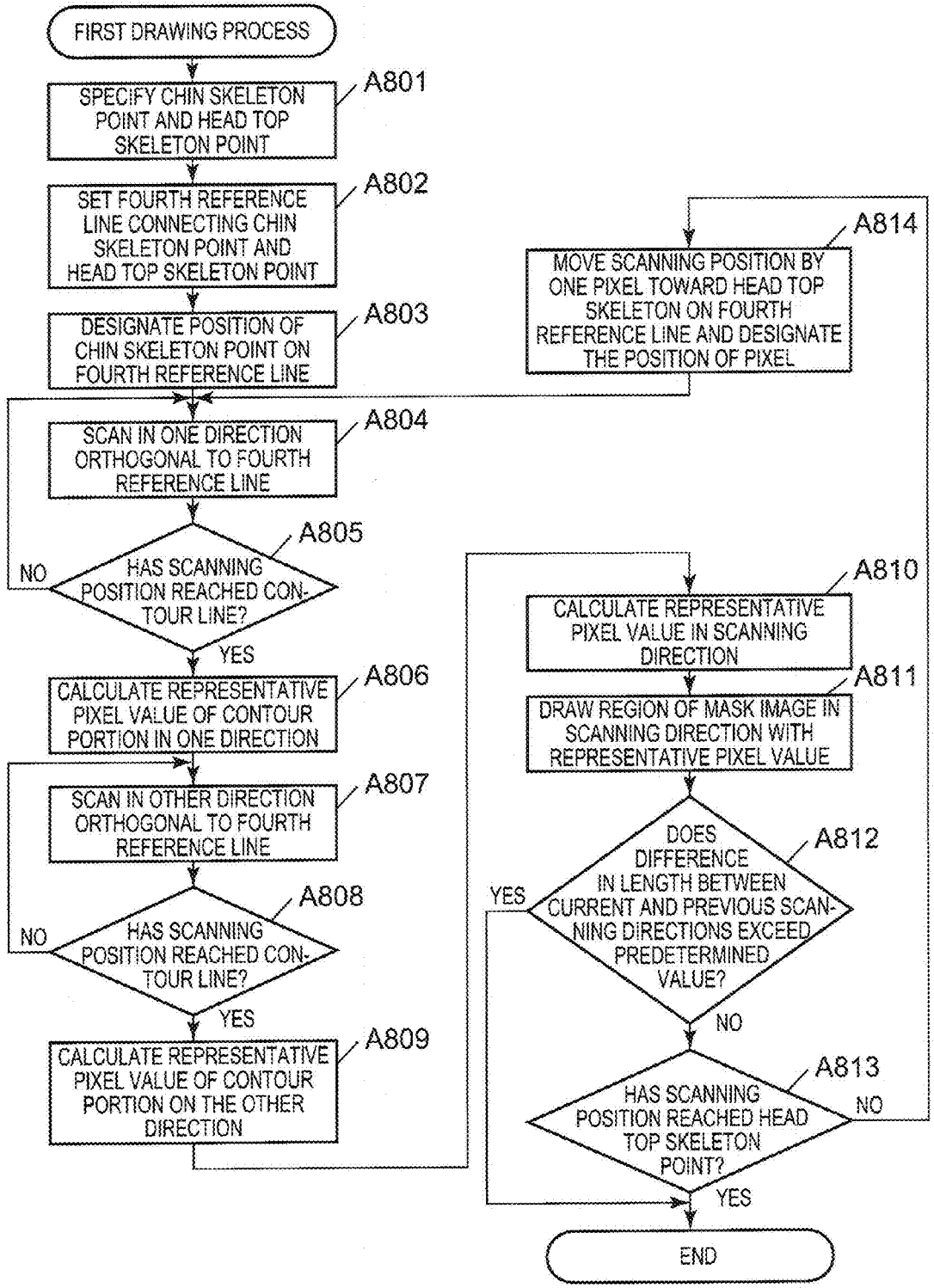
FIG. 14 is a flowchart showing an example of operations related to a first drawing process in the head drawing process of FIG. 13.

FIG. 14 is a flowchart showing an example of operations related to the first drawing process.

As shown in FIG. 14, the third specifying unit e3 of the color specifying unit 306e first specifies the chin skeleton point B17 and the head top skeleton point B18, which are set by the skeleton point setting unit 306d, in the subject clipped image P1 and mask image P2 (Step A801).

Next, the third specifying unit e3 sets the line connecting the chin skeleton point B17 and head top skeleton point B18 as the fourth reference line L4 in the mask image P2 (Step A802).

Subsequently, the third specifying unit e3 designates the position (coordinates) of the chin skeleton point B17 on the fourth reference line L4 in the mask image P2 (Step A803) and then scans in a predetermined one of the two directions orthogonal to the fourth reference line L4 (for example, in the left direction of FIG. 20B) one pixel by one pixel (Step A804).

The third specifying unit e3 determines whether or not the scanning position has reached the contour line of the portion corresponding to the head in the subject region Ps on the one side (Step A805). Herein, if it is determined that the scanning position has reached the contour line (Step A805; YES), the third specifying unit e3 obtains the coordinates of the point on the contour line in the mask image P2 and then based on the head image P1c (see FIG. 20A) of the subject clipped image P1, calculates the representative value of the pixel value of the point of interest on the contour line and the predetermined number of pixels adjacent to the point of interest on the contour line (Step A806).

Next, the third specifying unit e3 scans in the other one of the two directions orthogonal to the fourth reference line L4 (for example, in the right direction of FIG. 20B) one pixel by one pixel (Step A807).

The third specifying unit e3 determines whether or not the scanning position has reached the contour line of the portion corresponding to the head in the subject region Ps on the other side (Step A808). Herein, if it is determined that the scanning position has reached the contour line (Step A808; YES), the third specifying unit e3 obtains the coordinates of the point of interest on the contour line in the mask image P2 and then based on the head image P1c of the subject clipped image P1 (see FIG. 20A), calculates the representative value (for example, the average) of the pixel values of the point on the contour line and the predetermined number of pixels adjacent to the point of interest on the contour line (Step A809).

Next, based on the representative value of the pixel values calculated for the respective directions of the two directions orthogonal to the fourth reference line L4, the third specifying unit e3 calculates a representative pixel value (for example, the average) of the scanning position of the fourth reference line L4 (Step A810).

Subsequently, among the portion P3c corresponding to the head in the subject correspondent region Pa of the mask image P2 (back-side image P3), the back-side image creating unit 306f draws a region composed of a predetermined number of pixels along the scanning direction for the fourth reference line L4 with the representative pixel value calculated by the third specifying unit e3 (Step A811).

Next, the third specifying unit e3 determines for the respective directions of the two direction orthogonal to the fourth reference line L4, whether or not the difference in length between the region composed of the predetermined number of pixels along the current scanning direction and the region composed of the predetermined number of pixels along the previous scanning direction exceeds a predetermined value (Step A812).

Specifically, the third specifying unit e3 determines whether or not the difference exceeds the predetermined value depending on whether or not the region composed of the predetermined number of pixels along the current scanning direction is longer than the predetermined proportion of the length of the region composed of the predetermined number of pixels along the previous scanning direction.

If it is determined in Step A812 that the difference does not exceed the predetermined value (Step A812; NO), the third specifying unit e3 determines whether or not the scanning position on the fourth reference line L4 has reached the end on the head top skeleton point B18 (Step A813).

Herein, if it is determined that the scanning position has not reached the head top skeleton point 318 (Step A813; NO), the third specifying unit e3 moves the scanning position on the fourth reference line L4 toward the head top skeleton point B18 by one pixel and designates the position (coordinates) of the pixel of interest (Step A814). The third specifying unit e3 then shifts the processing to Step A804.

Thereafter, the animation processing unit 306 sequentially repeats the processing of Step A804 and the subsequent steps until it is determined in Step A813 that the scanning position has reached the head top skeleton point B18 (Step A813; YES). In such a manner, the portion P3c corresponding to the human head in the mask image P2 (back-side image P3) is drawn at each scan on a basis of the fourth reference line L4.

If it is determined in Step A813 that the scanning position on the fourth reference line L4 has reached the head top skeleton point B18 (Step A813; YES), the animation processing unit 306 terminates the first drawing process.

Also in the case where it is determined in Step A812 that the foregoing difference exceeds the predetermined value (A812; YES), the animation processing unit 306 termiates the first drawing process.

<Second Drawing Process>

A description is given below in detail of the second drawing process with reference to FIG. 15.

FIG. 15 is a flowchart showing an example of operations related to the second drawing process.

As shown in FIG. 15, the third specifying unit e3 of the color specifying unit 306e first performs the rectangle setting process (see FIG. 10) to set the rectangle R2 surrounding the portion corresponding to the human head in the subject clipped image P1 and mask image P2 (Step A901).

The rectangle setting process of the second drawing process is the substantially the same as the rectangle setting process of the hand region drawing process described above.

That is to say, the third specifying unit e3 obtains the coordinates of two chin-side intersections which are points on the contour line of the portion corresponding to the head in the subject region of the mask image P2 and at which the straight line which is orthogonal to the fourth reference line L4 and passes through the chin skeleton point B17.

Subsequently, the third specifying unit e3 scans a part of the contour line between the two chin-side intersections, including the head top skeleton point B14, in the portion corresponding to the head of the subject region of the mask image 2 and, based on the contour information, specifies second and third intersections D2 and D3 which are the farthest from the fourth reference line L4 in the orthogonal direction among the points on the contour line at which the contour line intersect with the two straight lines extending in parallel on both sides of the fourth reference line L4.

Thereafter, the third specifying unit e3 sets the rectangle R2 in the mask image P2 so that the rectangle R2 be in contact with the chin skeleton point B17, head top skeleton point B18, and the second and third intersections D1 and D2 and obtains the first to fourth vertices F1 to F4 of the rectangle R2.

The rectangle setting process is thus ended.

Next, the third specifying unit e3 sets a boundary line Q on the chin side based on the length of the fourth reference line L4 in the extending direction (Step A902). Specifically, within the rectangle R2, the third specifying unit e3 sets, as the boundary line Q, a straight line which passes through the point located at a predetermined ratio (for example, about 90 percent) to the length of the fourth reference line L4 in the extending direction and is orthogonal to the fourth reference line L4.

Next, the third specifying unit e3 specifies the position (coordinates) of the first vertex F1 on one side connecting the first and second vertices F1 and F2 of the rectangle R2 in the head image P2c (see FIG. 20B) of the mask image P2 (Step A903) and then scans in the direction orthogonal to the foregoing one side (for example, in the downward direction of FIG. 20B) one pixel by one pixel (Step A904).

The third specifying unit e3 determines whether or not the scanning position has reached the contour line of the portion corresponding to the head in the subject region Ps (Step A905). Herein, if it is determined that the scanning position has reached the contour line (Step A905; YES), the third specifying unit e3 obtains the coordinates of the point of interest on the contour line in the mask image P, and then based on the head image P1c (see FIG. 20A) of the subject clipped image P1, calculates the representative value (for example, the average value) of the pixel values of the point on the contour line and the predetermined number of pixels adjacent to the point of interest on the contour line along the scanning direction (for example, in the downward direction of FIG. 20B) (Step A906).

Next, the back-side image creating unit 306f determines whether or not the length of the portion corresponding to the head existing in the rectangle R2 in the direction parallel to the fourth reference line L4 related to the scanning position has reached the boundary line Q (Step A907).

Herein, it is determined that the length in the parallel direction at the scanning position has not reached the boundary line Q (Step A907; NO), in a region of the subject correspondent region Pa of the mask image P2 (back-side image P3) along the scanning direction, the back-side image creating unit 306f draws up to the position of a predetermined ratio to the length of the region from the position of the contour on the head top side with the representative pixel value, which is specified by the third specifying unit e3 (Step A908).

On the other hand, it is determined that the parallel length at the scanning position has reached the boundary line Q (Step A907; YES), the back-side image creating unit 306f calculates the length T of the background portion from the one side connecting the first and second vertices F1 and F2 to the contour on the head top side (Step A909). In the region of the subject correspondent region Pa of the mask image P2 (back-side image P3) in the scanning direction, the back-side image creating unit 306f then draws with the representative pixel value, which is specified by the third specifying unit e3, from the contour on the head top side to the chin-side position at the length T of the background portion from the boundary line Q (Step A910).

Next, the third specifying unit e3 determines whether or not the scanning position on the one side has reached the second vertex F2 (Step A911).

Herein, it is determined that the scanning position on the one side has not reached the second vertex F2 (Step A911; NO), the third scanning unit e3 moves the scanning position on the one side toward the second vertex F2 by one pixel and designates the position (coordinates) of the pixel of interest (Step A912). The third scanning unit e3 thus shifts the processing to Step A904.

Thereafter, the animation processing unit 306 sequentially repeats the processing of Step A904 and the subsequent steps until it is determined in Step A911 that the scanning position has reached the second vertex F2 (Step A911; YES). The portion corresponding to the human head in the mask image P2 (back-side image P3) is drawn at each scan on a basis of the one side.

If it is determined in Step A911 that the scanning position has reached the second vertex F2 (Step A911; YES), the animation processing unit 306 terminates the second drawing process.

As described above, according to the animation creating system 100 of the embodiment, based on the skeleton information related to the skeleton of the subject of the subject clipped image P1, the color information of the contour section of the subject region Ps is specified. Based on the color information of the contour section of the subject region Ps, the subject correspondent region Pa of the back-side image P3 is drawn by parts of the subject, thus creating the back-side image P3 showing the back of the subject in a pseudo manner. Accordingly, the back-side image P3 can be easily created using the color information of the contour section of the subject region Ps of the subject clipped image P1 so as to hardly give the viewer a feeling of strangeness. Specifically, on a basis of the reference line L passing through a skeleton point B set within the subject region Ps of the subject clipped image P1, the skeleton point B being associated with the skeleton, the color information of the contour section of the subject region Ps, especially the color information of the contour section at least one of the orthogonal and parallel directions to the reference line L in the subject region Ps is specified, and the subject correspondent region Pa of the back-side image P3 can be drawn with the specified color information by parts of the subjects including the reference lines L.

Accordingly, the subject correspondent region Pa of the back-side image P3 can be drawn by parts of the subject with color which the viewer can easily imagine from the color of the contour section of the subject region of the subject clipped image P1. This can prevent the back-side image P3 from giving the viewer a feeling of strangeness compared with the subject region Ps of the subject clipped image P1.

In the event of rotating the subject clipped image P1 as a still image (front image) in a predetermined direction, therefore, the back of the still image can be properly expressed by the back-side image P3. Moreover, only by setting the motion control points in the subject image of the subject clipped image P1, the corresponding motion control points can be automatically set also at the predetermined positions within the back-side image P3 corresponding to the subject clipped image P1. This can facilitate the processing to create an animation.

The rectangle R1 surrounding the portion corresponding to each of human hands and feet in the subject region Ps is set. on a basis of one side of the rectangle R1 parallel to the reference line L, scanning is performed in the direction orthogonal to the reference line L, and the color information of the part of the subject region Ps existing within the rectangle R1 is obtained for each scan. Based on the obtained color information of the subject region Ps, the color information of the contour section corresponding to each scan of the subject region Ps can be individually specified. Based on the color information of the contour section corresponding to each scan in the part of the subject region Ps existing in the rectangle R1, the portion P3a1 corresponding to each of the human hands and feet in the subject correspondent region Pa of the back-side image P3 is drawn for each scan. Accordingly, even for the portion corresponding to each of the human hands and foot, the subject region Ps of which has a complicated profile, using the rectangle R1 set at the portion corresponding to each of the human hands and foot, the part of the subject correspondent region Pa existing in the rectangle R1 in the back-side image P3 can be drawn at each scan with color that the viewer can easily imagine from the color of the contour portion of the subject region Ps of the subject clipped image P1.

Furthermore, on a basis of the extended line L3a, which is obtained by extending at least an end of the reference line L set in the portion corresponding to the human body in the subject region Ps in the extending direction of the reference line L by a predetermined proportion, scanning is performed in the orthogonal direction to the extended line L3a to obtain the color information of the subject region Ps for each scan. Based on the color information of the subject region Ps obtained at each scan, the color information of the contour portion of the subject region Ps corresponding to the scan can be individually specified. Based on the color information of the contour section of the subject region Ps corresponding to each scan, the portion P3b corresponding to the human body in the subject correspondent region Pa of the back-side image P3 is drawn at each scan. Accordingly, by using the extended line L3a, which is set in the portion corresponding to the human body, the subject correspondent region Pa of the back-side image P3 can be drawn for each scan with color that the viewer can easily imagine from the color of the contour section for each scan in the direction orthogonal to the extended line L3a in the subject region Ps of the subject clipped image P1.

Still furthermore, even when the process to specify the color information of the contour section related to the portion corresponding to the human body in the subject region Ps is performed after the back-side image creating process related to drawing of the portions corresponding to both arms and legs in the subject correspondent region Pa of the back-side image P3, by scanning in the direction orthogonal to the extension line L3a on a basis of the extended line L3a, the two points which sandwich the extension line L3a in the orthogonal direction and at which the scanning line intersects with the contour of the subject region Ps, or two points which sandwich the extension line L3a in the orthogonal direction and at which the scanning line intersects with any one of the arms and legs adjacent to the body in the subject region Ps can be specified at each scan. On a basis of the two points specified at each scan, the color information of the two contour sections of the subject region Ps can be obtained at the scan. In other words, the back-side image P3 can be created efficiently and appropriately in consideration of whether or not the portion corresponding to each of the arms and legs adjacent to the body in the subject correspondent region Pa of the back-side image P3 is already drawn.

Still furthermore, based on the color information of the contour section corresponding to each scan in the subject region Ps, the color information of the contour section being specified based on the color information of the contour section in the orthogonal direction to the reference line L set in the portion corresponding to the human head in the subject region Ps, that is, based on the color information of the subject region Ps obtained at each scan by scanning in the orthogonal direction to the reference line L on a basis of the reference line L, the portion P3c corresponding to the human head in the subject correspondent region Pa of the back-side image P3 can be drawn in the orthogonal direction.

Thereafter, based on the color information of the contour section in the parallel direction to the reference line L, that is, based on the color information of the contour section corresponding to each scan in the subject region Ps, which is specified based on the color information of the subject region Ps existing in the rectangle R2, the color information being obtained at each scan in parallel direction to the reference line L on a basis of one side of the rectangle R2 surrounding the portion corresponding to the human head orthogonal to the reference line L, the portion P3c corresponding to the human head can be drawn in the parallel direction to the reference line L in the subject correspondent region Pa of the back-side image P3. Specifically, the portion P3c corresponding to the human head in the subject correspondent region Pa of the back-side image P3 can be drawn to the predetermined position in the parallel direction based on the length of the part of the subject region Ps existing in the rectangle R2 in the parallel direction to the reference line L or the length of one side of the rectangle R2 parallel to the reference line L.

Accordingly, the subject correspondent region Pa of the back-side image P3 can be drawn with a color that the viewer can easily imagine from the color of the contour section in the orthogonal or parallel direction to the reference line L in the subject region Ps of the subject clipped image P1 taking into consideration of the color of the contour sections in the directions orthogonal and parallel to the reference line L. In other words, in the head top side, in consideration of the color of the contour portion in the orthogonal direction to the reference line L, the subject correspondent region Pa of the back-side image P3 can be drawn with a color that the viewer can easily imagine from the color of the hair, for example. On the other hand, in a part near the chin and away from the head top, in consideration of the color of the contour part in the parallel direction to the reference line L, the subject correspondent region Pa of the back-side image P3 can be drawn with a color that the viewer can easily imagine from the colors of the ears and the neck skin, for example.

The present invention is not limited to the aforementioned embodiment, and various improvements and design changes may be performed without departing form the scope of the invention.

For example, in the foregoing embodiment, based on the predetermined operation for the user terminal 2 by the user, the animation is created by the server (image forming apparatus) 3 that functions as a Web server; however, this is merely an example, and the configuration of the image forming apparatus is changeable appropriately and arbitrarily. That is to say, the function of the animation processing unit 306 related to creation of the back-side image P3 is implemented by software which is installed in the user terminal 2. In such a way, the animation creation process may be performed only by the user terminal 2 itself without requiring the communication network N.

Moreover, in the aforementioned embodiment, the processed object is the subject clipped image P1, but is merely an example. The processed object is not limited to this and is properly and arbitrarily changeable. For example, the processed object can be an image composed of only the subject region Ps from the start, for example.

Furthermore, the back-side image creating process is performed in the order of the arm drawing process, leg drawing process, body drawing process, and head drawing process, but the order of the processes is merely an example. The order of processes is not limited to the above order and can be changed properly and arbitrarily.

Still furthermore, the head drawing process is performed in the order of the first and second drawing processes but is merely an example. The order thereof is not limited to this and can be changed properly and arbitrarily. That is to say, for example, in the case of the subject clipped image P1 related to a person with a hat on his/her head or the like, the second drawing process to draw the portion corresponding to the head, which exists in the rectangle R2 in the subject correspondent region Pa of the mask image P2, in the parallel direction may be performed before the first drawing process to draw in the orthogonal direction to the reference line L. Furthermore, it may be configured that the user is allowed to select one of back-side images P3 which are created in the order of first and second drawing processes and in the inverse order thereof.

Moreover, the animation creating process of the foregoing embodiment may be configured so as to be capable of adjusting the synthesis positions and sizes of the subject images. That is to say, if determining that an adjustment instruction for the synthesis positions and sizes of the subject images is inputted based on the predetermined operation for the operation input unit 202 by the user, the central control unit 201 of the user terminal 2 transmits a signal, which corresponds to the adjustment instruction, to the server 3 through the predetermined communication network N by the communication control unit 206. Then, based on the adjustment instruction inputted through the communication control unit, the animation processing unit 306 of the server 3 may set the synthesis positions of the subject images to desired synthesis positions or may set the sizes of the subject to desired sizes.

Furthermore, in the foregoing embodiment, the personal computer is illustrated as the user terminal 2; however, this is merely an example, and the user terminal 2 of the present invention is not limited to this, and is changeable appropriately and arbitrarily. For example, the user terminal may be a cellular phone or the like.

Note that the data of the subject clipped image P1 and the animation may incorporate control information for forbidding predetermined alteration by the user.

In addition, in the foregoing embodiment, the functions as the first obtaining unit, the second obtaining unit, the specifying unit, and the creating unit are implemented in such a manner that the image obtaining unit 306a, the skeleton information obtaining unit 306b, the color specifying unit 306e, and the back-side creating unit 306f are driven under the control of the central control unit 301. However, the configuration of the present invention is not limited to this, and the aforementioned functions may be implemented by a predetermined program and the like which are executed by the CPU of the central control unit 301.

That is to say, in a program memory (not shown) that stores programs, a program is stored in advance, which includes a first obtaining processing routine, a second obtaining processing routine, a specification processing routine, and a creation processing routine. Then, the first obtaining processing routine may cause the CPU of the central processing unit 301 to function as the first obtaining unit which obtains the subject image including the subject region Ps. Moreover, the second obtaining processing routine may cause the CPU of the central processing unit 301 to function as the second obtaining unit which obtains the skeleton information related to the skeleton of the subject in the subject image obtained by the first obtaining unit. Moreover, the specification processing routine may cause the CPU of the central control unit 301 to function as the specification unit which specifies the color information of the contour part of the subject region Ps based on the skeleton information obtained by the second obtaining unit. Moreover, the creation processing routine may cause the CPU of the central control unit 301 to function as the creating unit which draws the subject correspondent region Pa of the back-side image P3 representing the back of the subject in a pseudo manner based on the color information of the contour part of the subject region Ps specified by the specification unit to create the back-side image P3.

As a computer-readable medium storing the program for executing the foregoing processes, it is possible to apply a nonvolatile memory such as a flash memory and a portable recording medium such as a CD-ROM as well as the ROM, the hard disc, and the like. Moreover, the medium which provides the data of the program through the predetermined communication network can be a carrier wave.

What is claimed is:
1. An image creation method comprising:
obtaining a subject image including a subject region;
specifying color information of a contour portion of the obtained subject region;
creating a back-side-image, based on the specified color information of the contour portion of the subject region, by drawing a subject correspondent region of the back-side image showing a back side of the subject in a pseudo manner;
obtaining skeleton information related to a skeleton of a subject in the obtained subject image, wherein the color information of the contour portion of the subject region is specified based on the obtained skeleton information;
setting, based on the obtained skeleton information, skeleton points associated with the skeleton in the subject region of the subject image, wherein the color information of the contour portion of the subject region is specified based on a reference line passing through the set skeleton points;
setting a rectangle surrounding each of portions corresponding to hands and feet in the subject region, the rectangle having (i) two sides parallel to the reference line passing through one of the skeleton points set at a distal end side of the portion corresponding to the hand or foot and another one of the skeleton points adjacent to the one skeleton point and (ii) two sides orthogonal to said reference line; and scanning in a direction orthogonal to the reference line based on one of the sides of the rectangle parallel to the reference line to obtain for each scan, the color information of the subject region existing in the rectangle, wherein based on the color information of the subject region existing in the rectangle, which is obtained for each scan, the color information of the contour portion corresponding to each scan in the subject region is specified.

2. The image creation method according to claim 1, wherein, based on the specified color information of the contour portion corresponding to each scan in the subject region existing in the rectangle, the portions corresponding to the hands and feet in the subject correspondent region of the back-side image are drawn for each scan.

3. An image creation method, comprising:

obtaining a subject image including a subject region;

specifying color information of a contour portion of the obtained subject region;

creating a back-side-image, based on the specified color information of the contour portion of the subject region, by drawing a subject correspondent region of the back-side image showing a back side of the subject in a pseudo manner;

obtaining skeleton information related to a skeleton of a subject in the obtained subject image, wherein the color information of the contour portion of the subject region is specified based on the obtained skeleton information;

setting, based on the obtained skeleton information, skeleton points associated with the skeleton in the subject region of the subject image, wherein the color information of the contour portion of the subject region is specified based on a reference line passing through the set skeleton points;

setting an extended line which is obtained by extending at least one end of the reference line in an extending direction of the reference line by a predetermined ratio, the reference line passing through one of the skeleton points set at a portion corresponding to a body in the subject region and extending substantially along a spine; and scanning based on the set extended line in a direction orthogonal to the extended line to obtain the color information of the subject region for each scan, wherein based on the color information of the subject region, which is obtained for each scan, the color information of the contour portion corresponding to each scan in the subject region is specified.

4. The image creation method according to claim 3, further comprising:

scanning based on the extended line in a direction orthogonal to the extended line to specify at each scan, two points which are located on a contour of the subject region and sandwich the extended line in the orthogonal direction or two points which are located in both arms or legs adjacent to the body in the subject region and sandwich the extended line in the orthogonal direction, and obtaining the color information of two contour portions of the subject region for each scan based on the two points specified at the scan.

5. The image creation method according to claim 3, wherein the specifying related to the portion corresponding to the body in the subject region is performed after the portions corresponding to the both arms and legs in the subject correspondent region of the back-side image are drawn.

6. The image creation method according to claim 3, wherein based on the specified color information of the contour portion corresponding to each scan in the subject region, the portion corresponding to the body in the subject correspondent region of the back-side image is drawn for each scan.

7. An image creation method, comprising:

obtaining a subject image including a subject region;

specifying color information of a contour portion of the obtained subject region;

creating a back-side-image, based on the specified color information of the contour portion of the subject region, by drawing a subject correspondent region of the back-side image showing a back side of the subject in a pseudo manner;

obtaining skeleton information related to a skeleton of a subject in the obtained subject image, wherein the color information of the contour portion of the subject region is specified based on the obtained skeleton information;

setting, based on the obtained skeleton information, skeleton points associated with the skeleton in the subject region of the subject image, wherein the color information of the contour portion of the subject region is specified based on a reference line passing through the set skeleton points;

based on the specified color information of the contour portion in a direction orthogonal to the reference line passing through one of the skeleton points set in a distal end side of the portion corresponding to a head in the subject region and another one of the skeleton points adjacent to the one skeleton point, the portion corresponding to the head in the subject correspondent region of the back-side image is drawn in the orthogonal direction; and based on the specified color information of the contour portion in a direction parallel to the reference line, the portion corresponding to the head in the subject correspondent region of the back-side image is drawn in the parallel direction.

8. The image creation method according to claim 7, further comprising:

scanning in the orthogonal direction to the reference line based on the reference line to obtain the color information of the subject region at each scan, and based on the color information of the subject region obtained at each scan, specifying the color information of the contour portion corresponding to each scan in the subject region.

9. The image creation method according to claim 7, further comprising:

setting a rectangle surrounding the portion corresponding to the head, the rectangle having two sides parallel to the reference line and two sides orthogonal to said reference line; and scanning in a direction parallel to the reference line based on one of the sides of the set rectangle, that is orthogonal to the reference line, to obtain the color information of the subject region existing in the rectangle at each scan, and based on the color information of the subject region obtained at each scan, the color information of the contour portion corresponding to each scan in the subject region is specified.

10. The image creation method according to claim 9, wherein based on a length of the subject region existing in the rectangle which is in the parallel direction to the reference line and a length of one side of the rectangle parallel to the reference line, the portion corresponding to the head in the subject correspondent region of the back-side image is drawn in the parallel direction up to a predetermined position.

* * * * *